(12) United States Patent
Usui et al.

(10) Patent No.: US 10,091,861 B2
(45) Date of Patent: Oct. 2, 2018

(54) ELECTRONIC DEVICE

(71) Applicant: Kabushiki Kaisha Toshiba, Minato-ku (JP)

(72) Inventors: Takashi Usui, Saitama (JP); Mitsuaki Kato, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/266,488

(22) Filed: Sep. 15, 2016

(65) Prior Publication Data

US 2017/0006692 A1  Jan. 5, 2017

Related U.S. Application Data

(63) Continuation of application No. PCT/JP2014/083572, filed on Dec. 18, 2014.

(30) Foreign Application Priority Data

May 30, 2014  (JP) .................. 2014-113385

(51) Int. Cl.
*H02J 9/04* (2006.01)
*H05B 37/02* (2006.01)
(Continued)

(52) U.S. Cl.
CPC .......... *H05B 37/0227* (2013.01); *H02J 9/005* (2013.01); *H05B 33/0875* (2013.01);
(Continued)

(58) Field of Classification Search
CPC .......................... H05B 37/02; H05B 37/0227; H05B 33/0884; H05B 33/0875; H02J 9/00; H02J 9/005; H02J 9/02–9/06; G01R 19/00
(Continued)

(56) References Cited

U.S. PATENT DOCUMENTS

| 5,247,205 A | 9/1993 | Mototani et al. |
| 2010/0327766 A1* | 12/2010 | Recker ............ H02J 9/02 315/291 |

(Continued)

FOREIGN PATENT DOCUMENTS

| JP | 3-78444 | 4/1991 |
| JP | 4-39088 | 4/1992 |

(Continued)

OTHER PUBLICATIONS

International Search Report dated Mar. 3, 2015 in PCT/JP2014/083572, filed Dec. 18, 2014 ( with English Translation).

(Continued)

*Primary Examiner* — Tung X Le
*Assistant Examiner* — Henry Luong
(74) *Attorney, Agent, or Firm* — Oblon, McClelland, Maier & Neustadt, L.L.P.

(57) ABSTRACT

According to one embodiment, an electronic device capable of switching power on and power off by a switch outside the electronic device, the electronic device includes a determination unit, a detection unit, an output unit, and a control unit. The determination unit determines whether power is supplied from an AC power source or not. The detection unit detects a conductive state of the switch. The control unit performs at least one of cutting off power to be supplied to the output unit, supplying power from the AC power source to the output unit, and supplying power from a second power source different from the AC power source to the output unit.

10 Claims, 22 Drawing Sheets

(51) Int. Cl.
*H05B 33/08* (2006.01)
*H02J 9/00* (2006.01)
*H02J 9/06* (2006.01)

(52) U.S. Cl.
CPC ......... *H05B 33/0884* (2013.01); *H05B 37/02* (2013.01); *H02J 9/06* (2013.01)

(58) Field of Classification Search
USPC ................ 315/307–308, 291, 86; 324/76.11
See application file for complete search history.

(56) References Cited

U.S. PATENT DOCUMENTS

| | | | |
|---|---|---|---|
| 2012/0080944 A1* | 4/2012 | Recker | ...................... H02J 9/02 307/25 |
| 2013/0113393 A1 | 5/2013 | Fujita et al. | |
| 2013/0223077 A1 | 8/2013 | Kato et al. | |
| 2014/0265845 A1 | 9/2014 | Williams | |
| 2014/0293654 A1 | 10/2014 | Kato et al. | |
| 2015/0085492 A1 | 3/2015 | Kato et al. | |
| 2015/0155743 A1 | 6/2015 | Noguchi | |
| 2015/0194843 A1* | 7/2015 | Singer | ...................... H02J 9/061 315/86 |
| 2015/0268398 A1 | 9/2015 | Ohno et al. | |
| 2015/0268405 A1 | 9/2015 | Ohno et al. | |
| 2015/0288223 A1* | 10/2015 | Sato | ...................... G01R 17/00 307/66 |
| 2016/0157309 A1* | 6/2016 | Geng | ................. H05B 33/0806 307/20 |
| 2016/0230978 A1 | 8/2016 | Kato et al. | |

FOREIGN PATENT DOCUMENTS

| | | |
|---|---|---|
| JP | 2009-123571 A | 6/2009 |
| JP | 2009-199901 A | 9/2009 |
| JP | 2011-119136 A | 6/2011 |
| JP | 4776609 B2 | 9/2011 |
| JP | 2012-164436 A | 8/2012 |
| JP | 3177856 U | 8/2012 |
| JP | 2013-101785 A | 5/2013 |
| JP | 2013-125709 | 6/2013 |
| JP | 2013-125709 A | 6/2013 |
| JP | 2013-175406 A | 9/2013 |
| JP | 2014-2904 A | 1/2014 |
| JP | 2014-82910 | 5/2014 |
| JP | 2014-512648 | 5/2014 |
| JP | 2014-191921 A | 10/2014 |
| JP | 3193468 U | 10/2014 |
| JP | 2015-064989 A | 4/2015 |
| JP | 2015-179571 A | 10/2015 |
| JP | 2015-179579 A | 10/2015 |
| JP | 2016-143653 A | 8/2016 |

OTHER PUBLICATIONS

Written Opinion dated Mar. 3, 2015 in PCT/JP2014/083572, filed on Dec. 18, 2014.
Japanese Office Action dated May 31, 2016 in Japanese Application 2015-136021 ( with English Translation).
"Overhead distribution—From reaching the house through the Where?" http://www.chuden.co.jp/kids/kids_denki/home/hom_kaku/ Sep. 14, 2016, 3 pages.

* cited by examiner

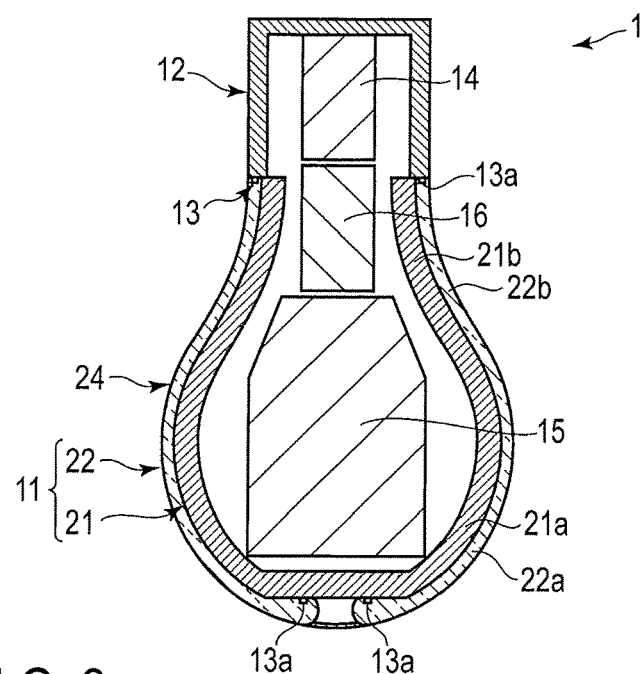
F I G. 2
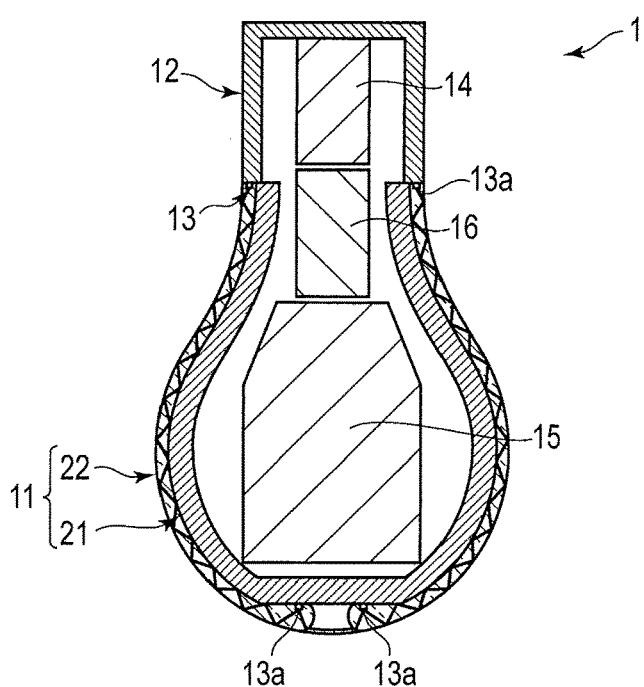
F I G. 3

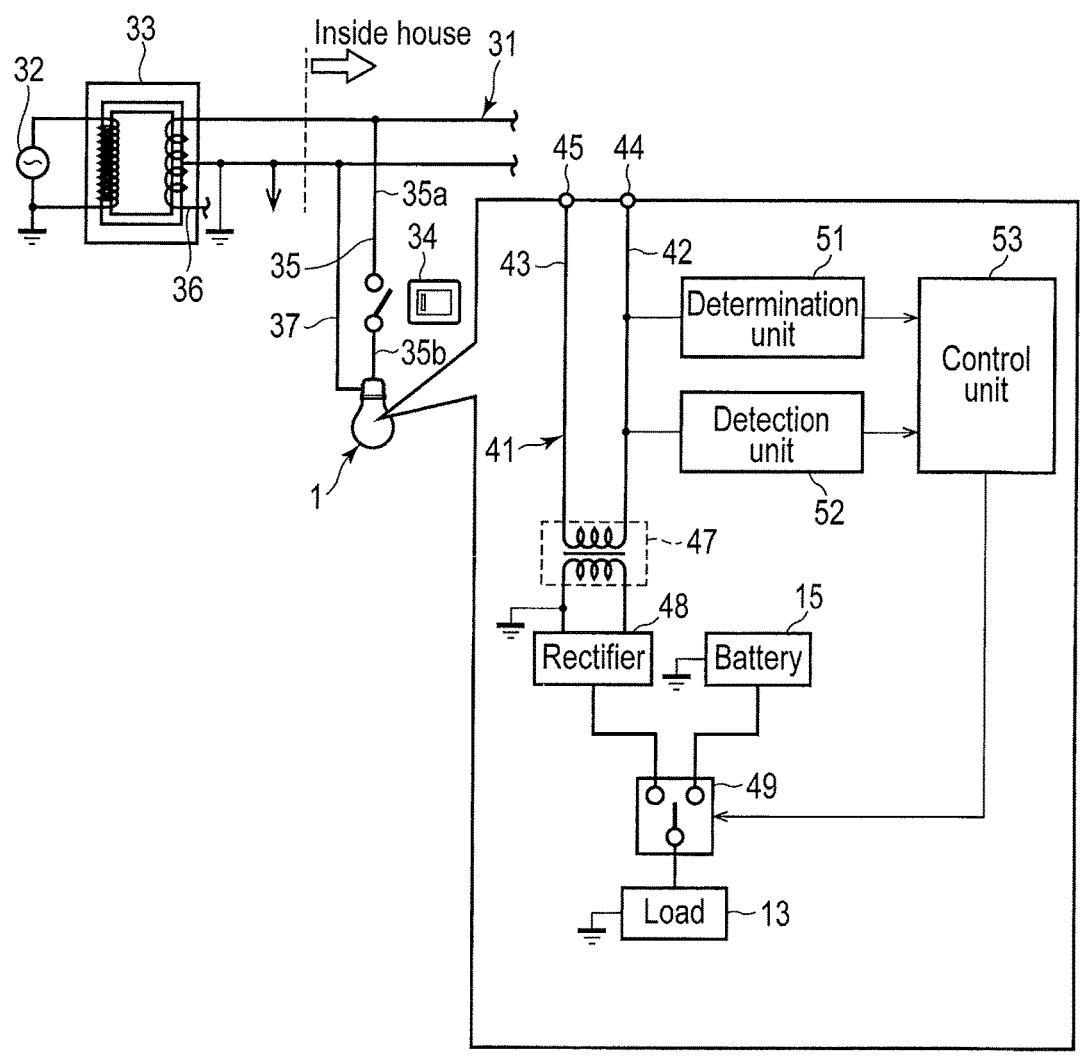
F I G. 4

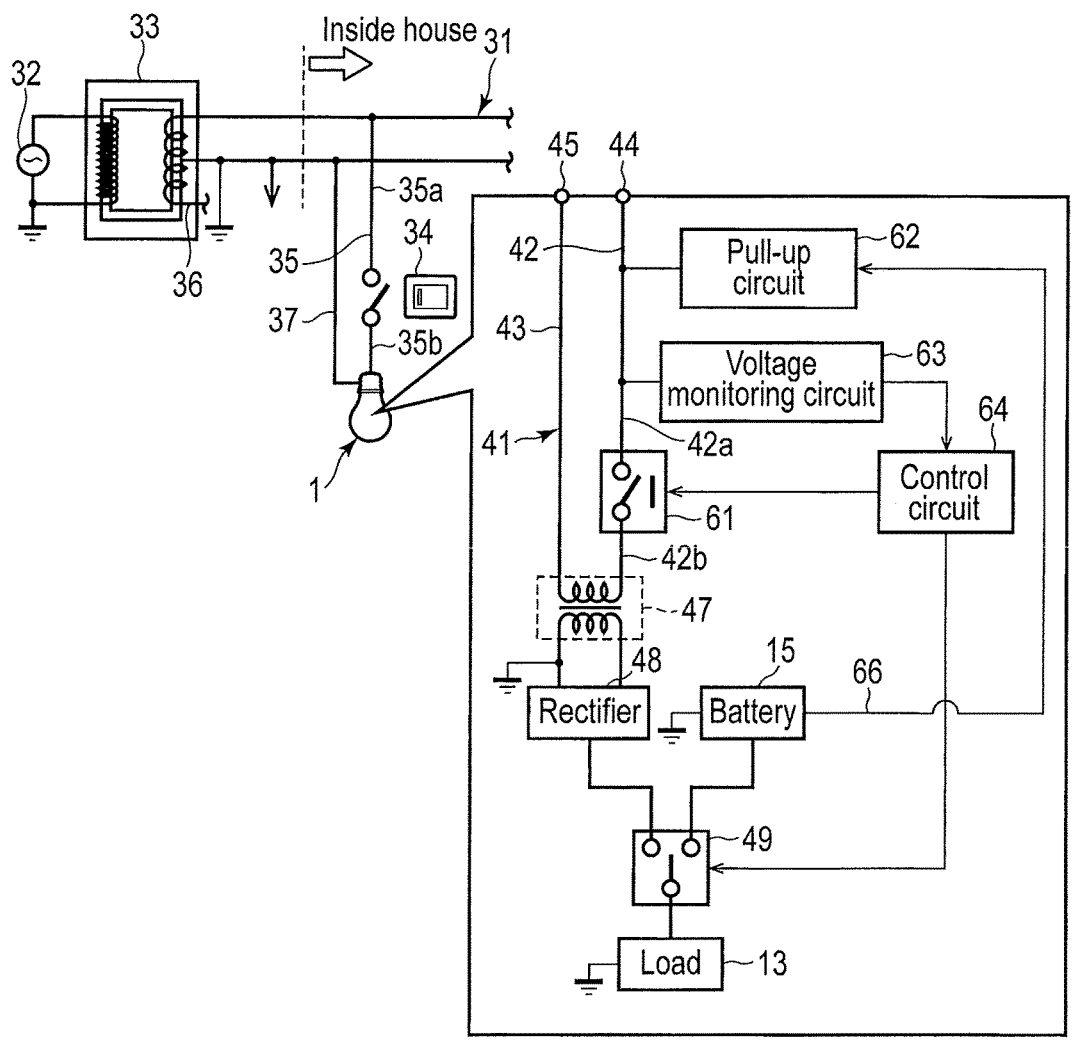
F I G. 5

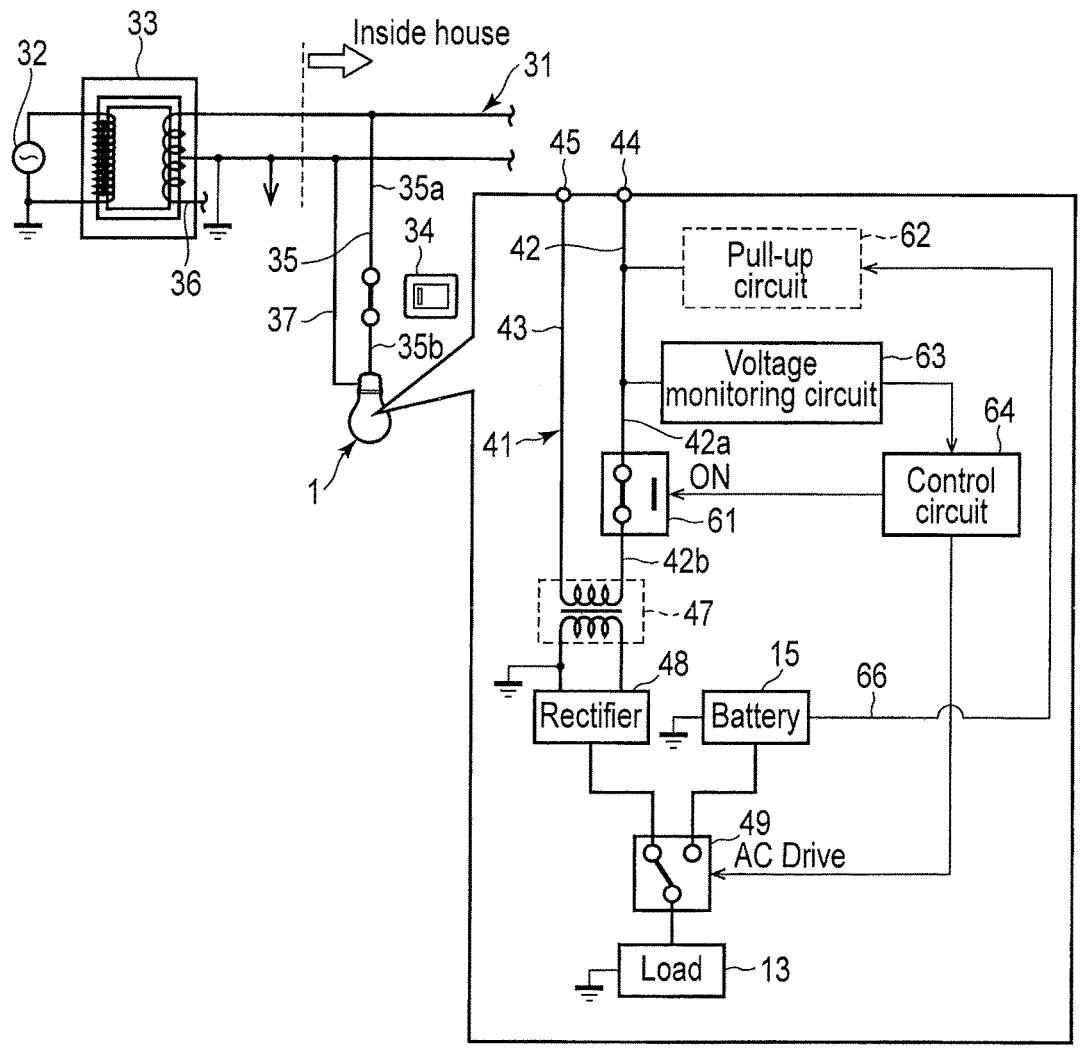
F I G. 8

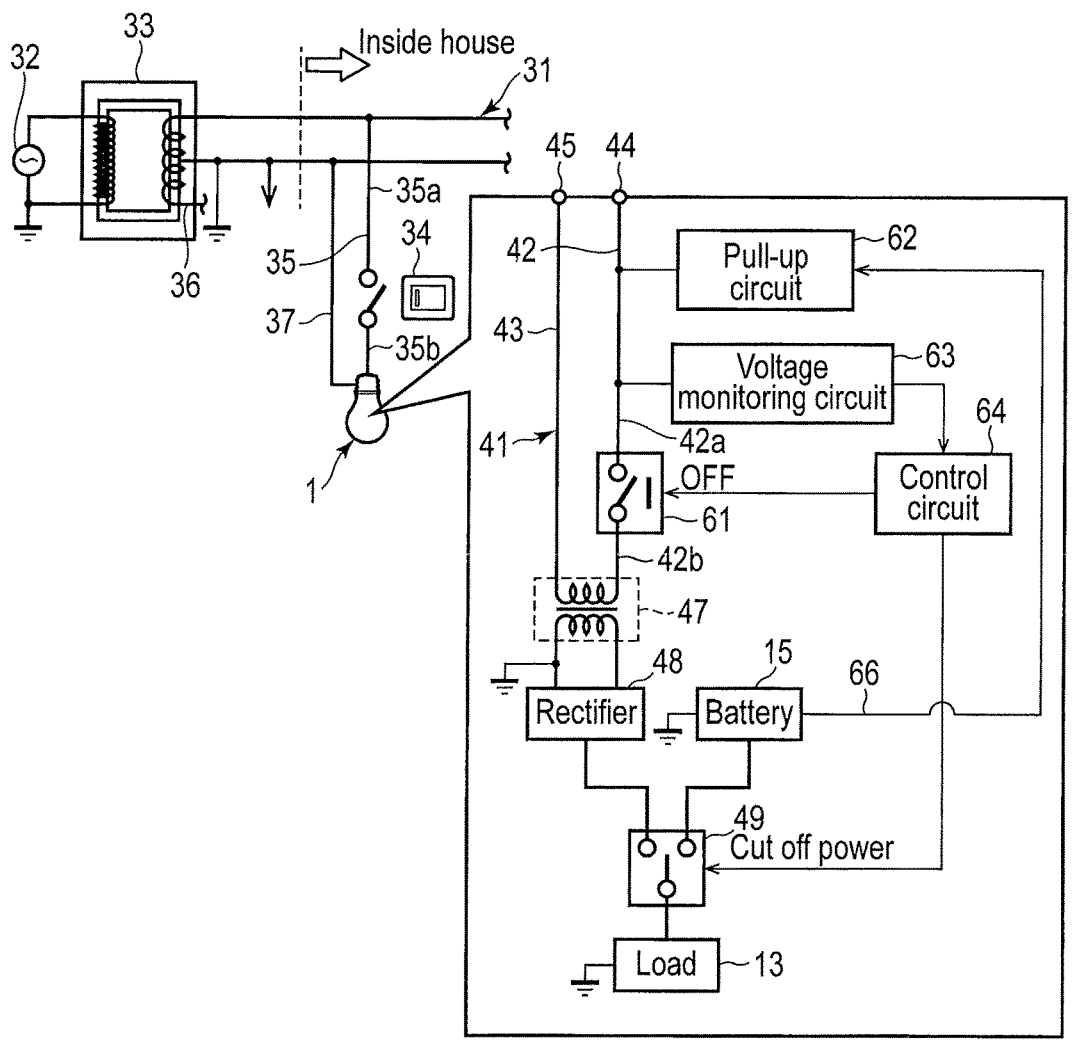
F I G. 9

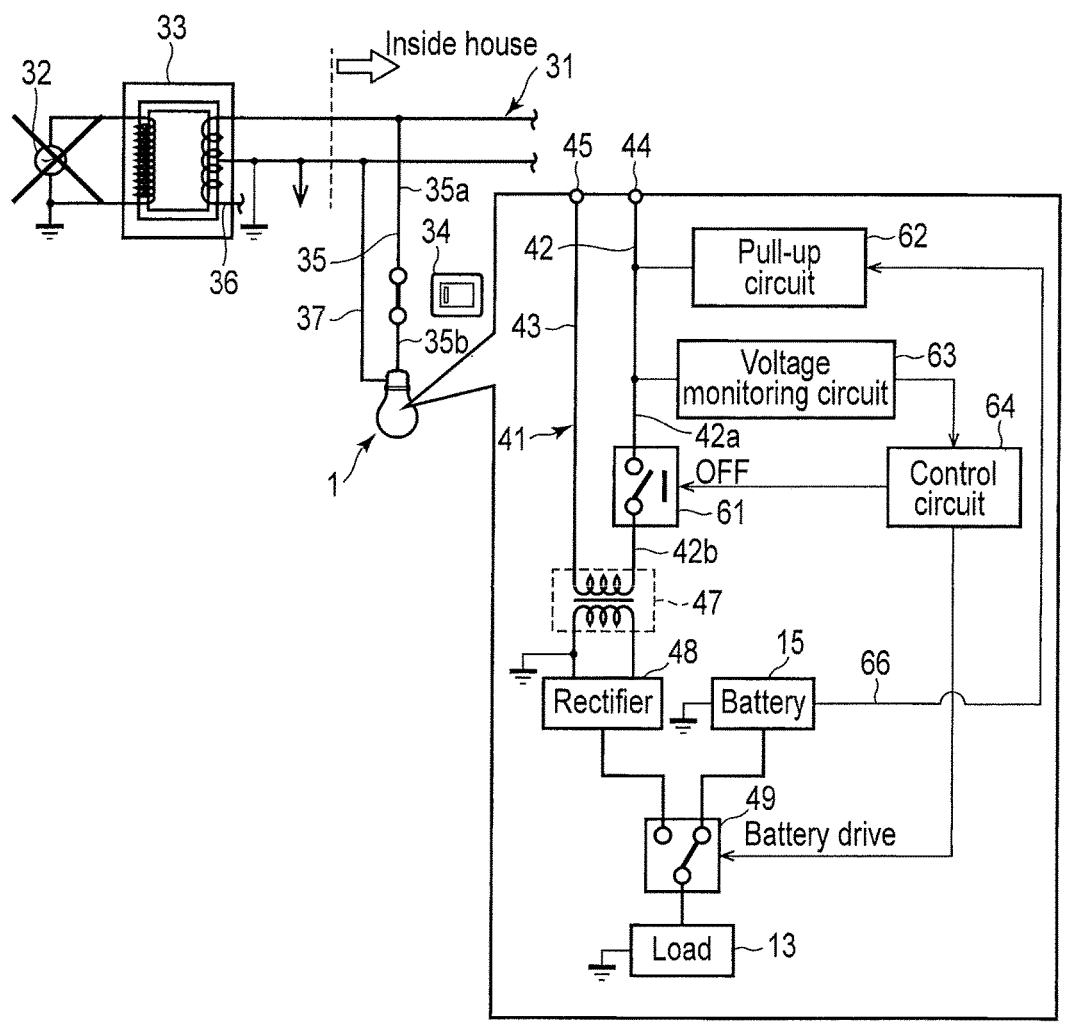
F I G. 10

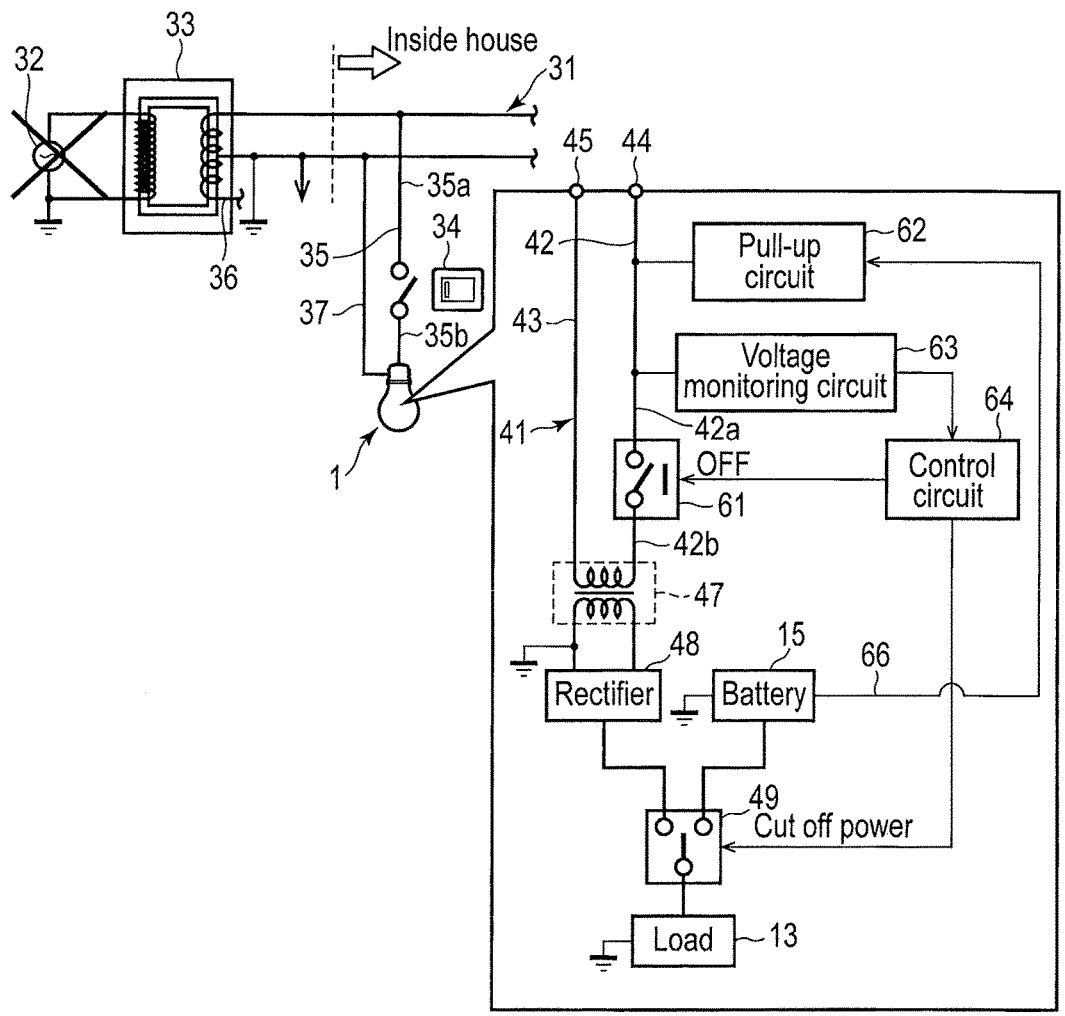
F I G. 11

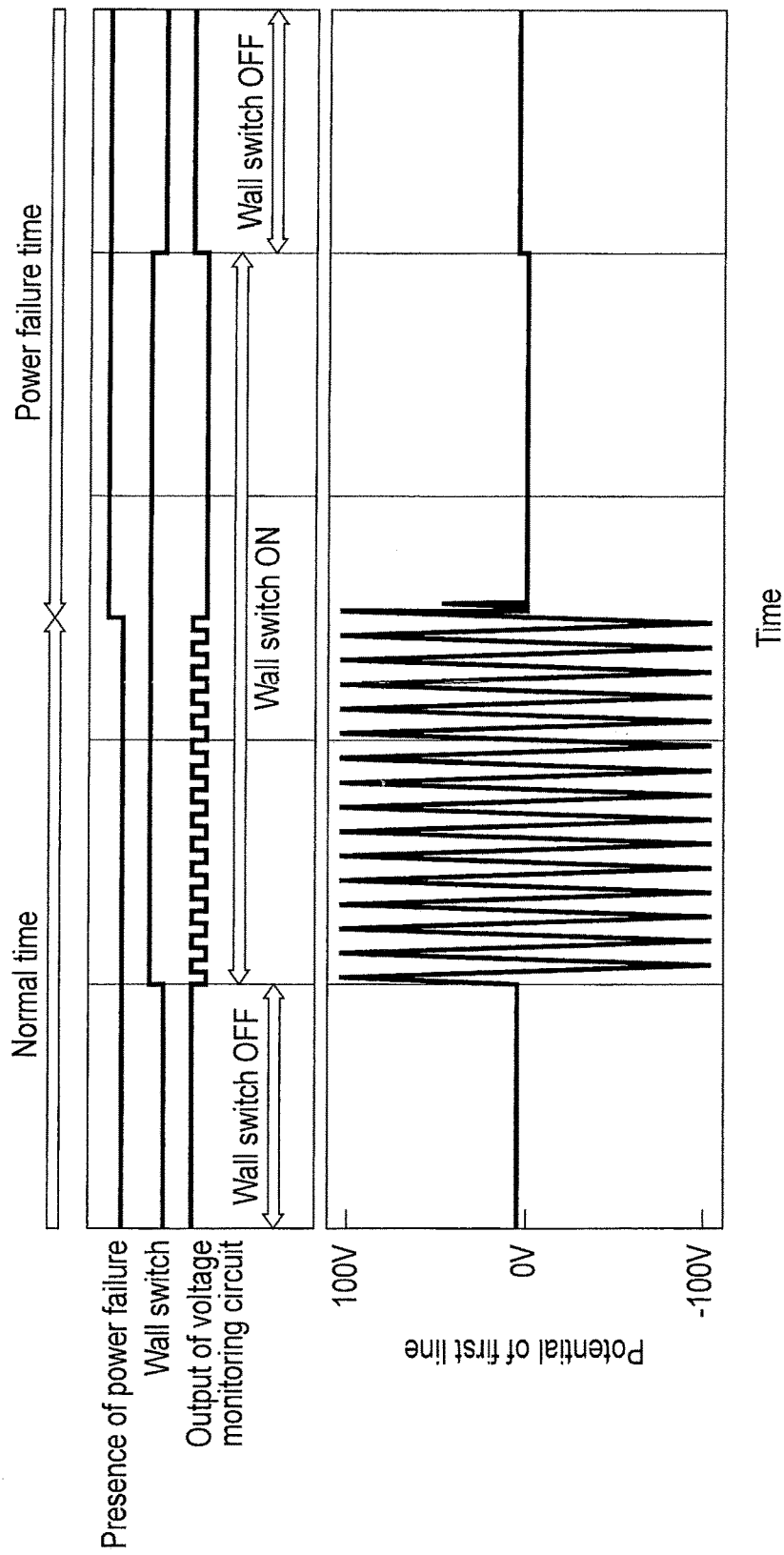
F I G. 12

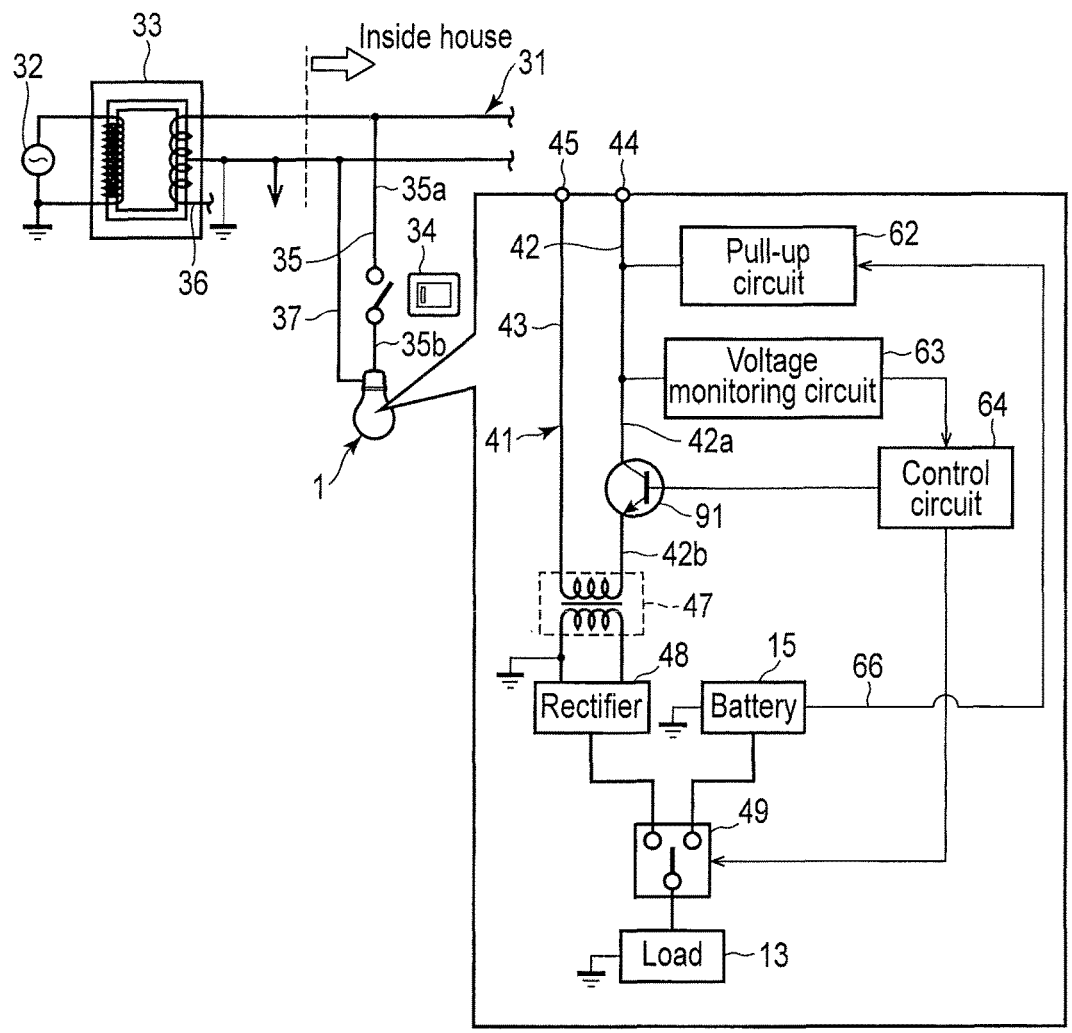
F I G. 13

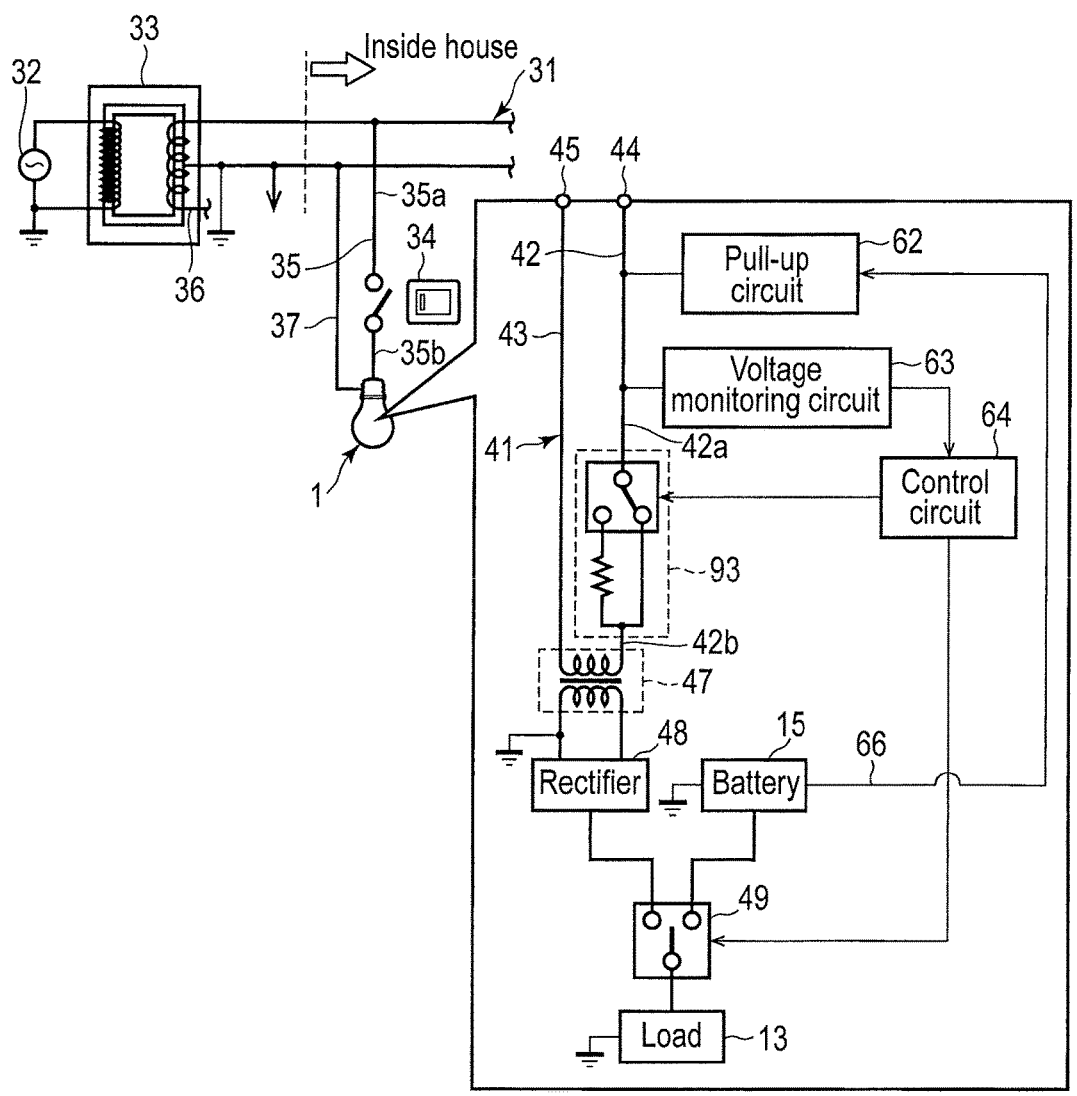
F I G. 14

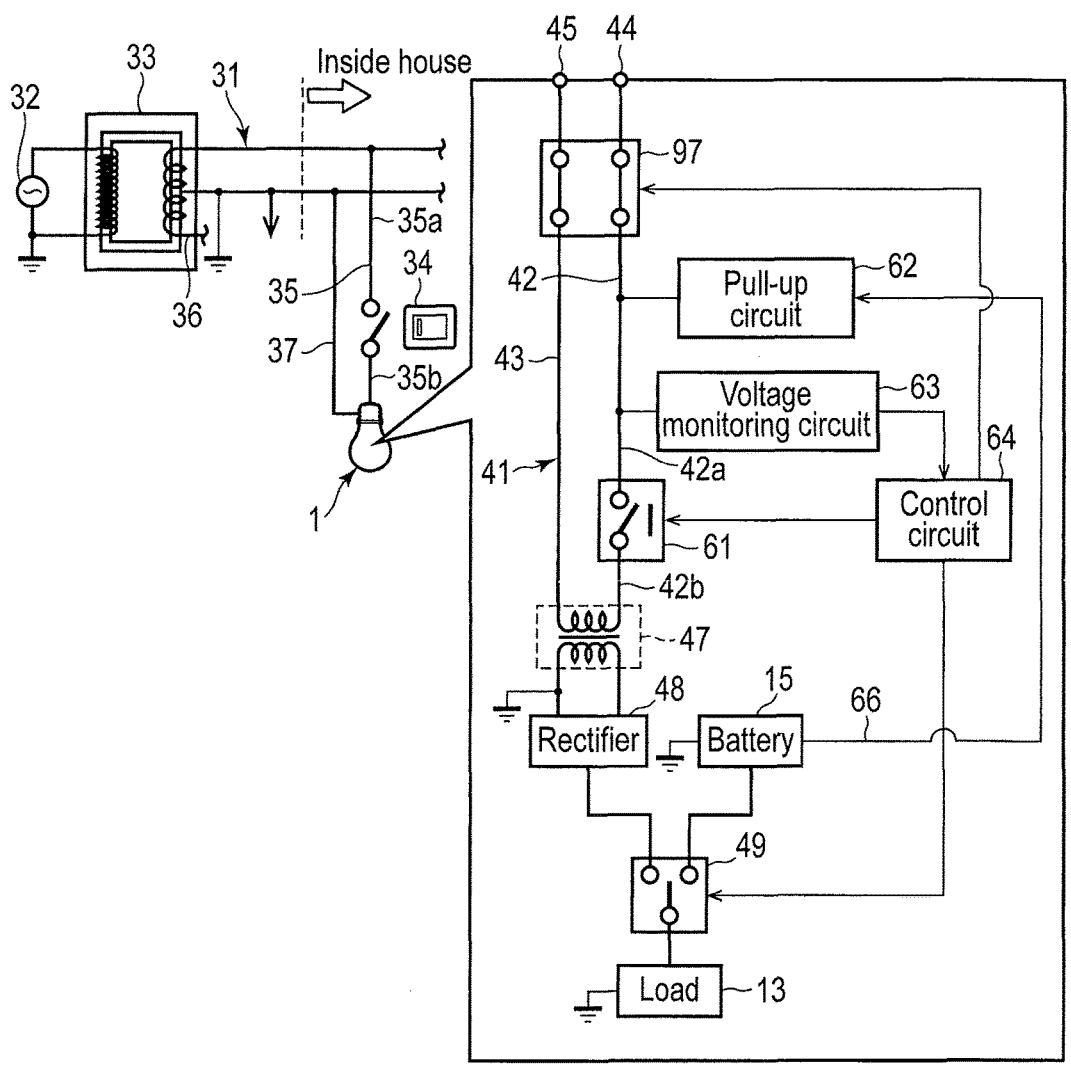
F I G. 16

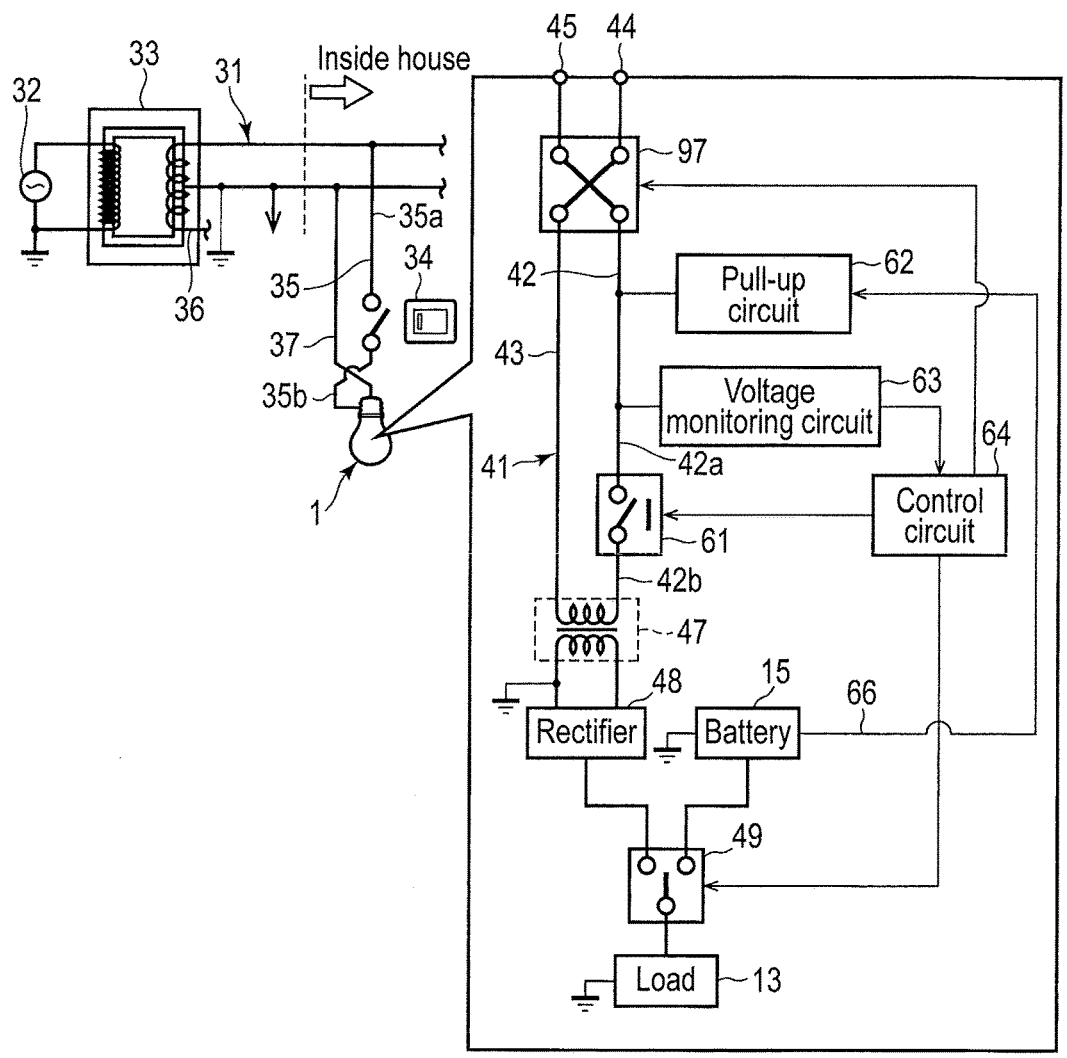
F I G. 17

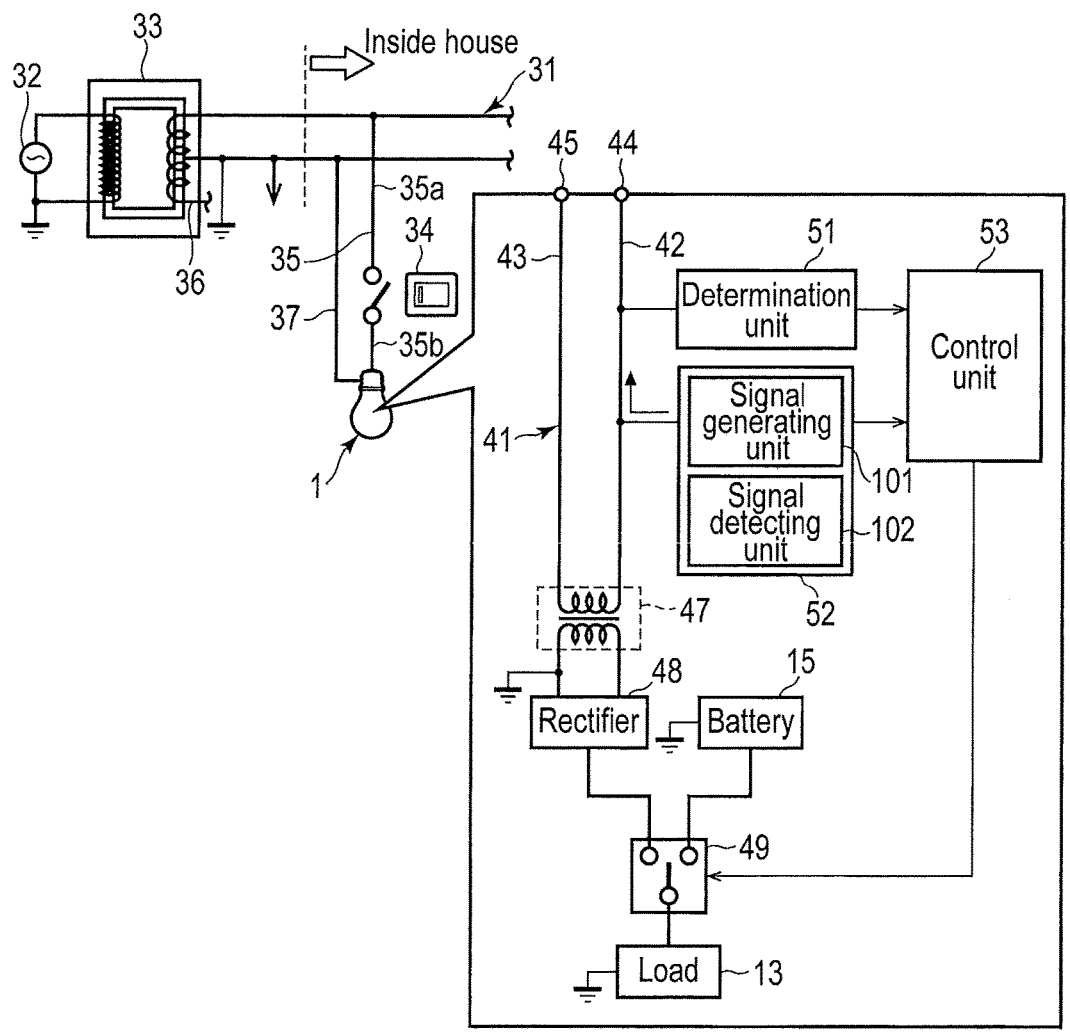
F I G. 18

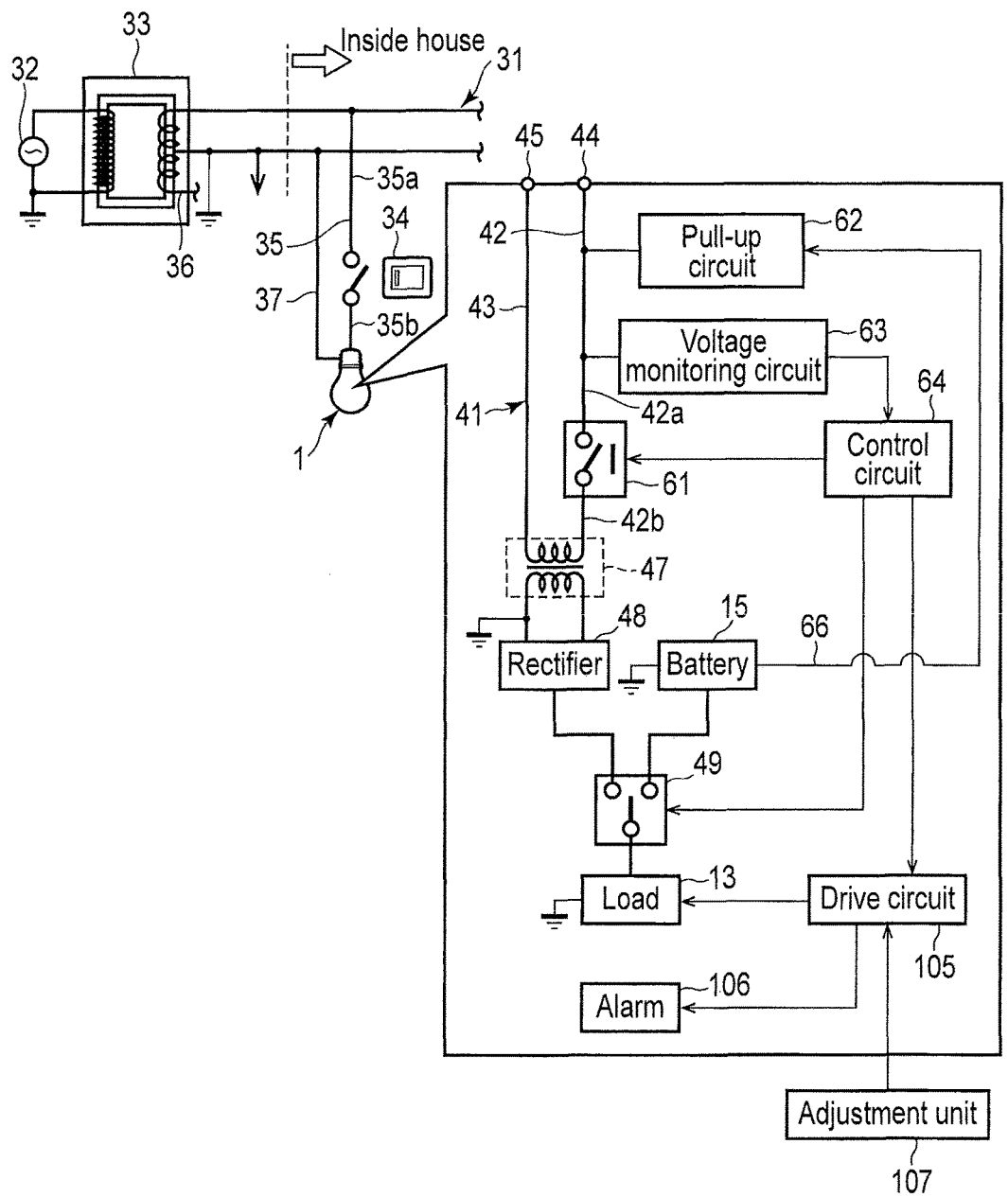
F I G. 20

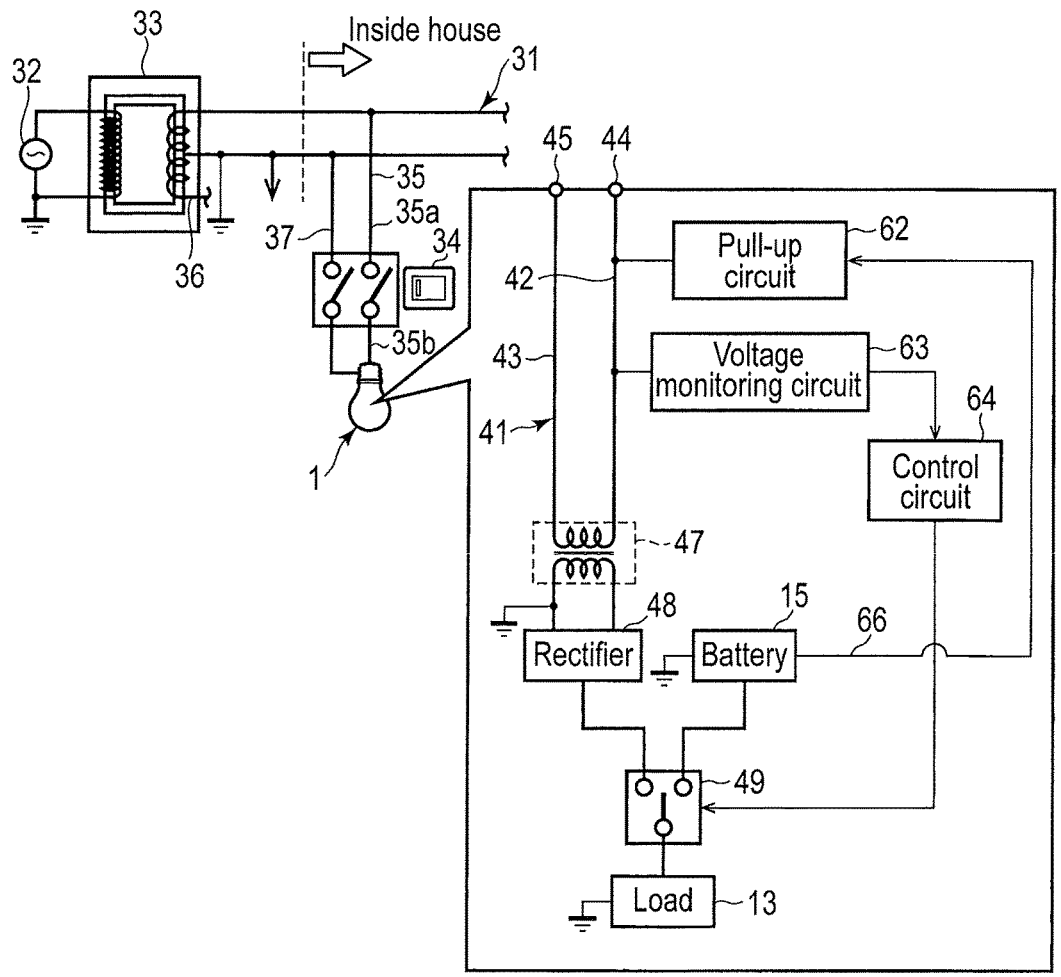
F I G. 22

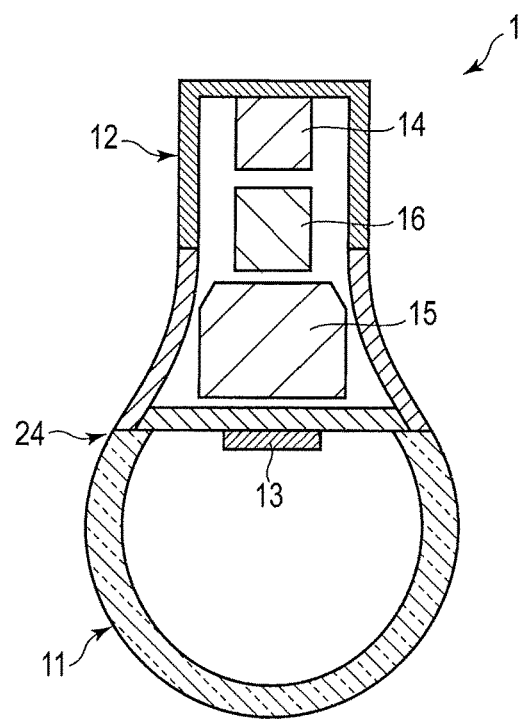
F I G. 23
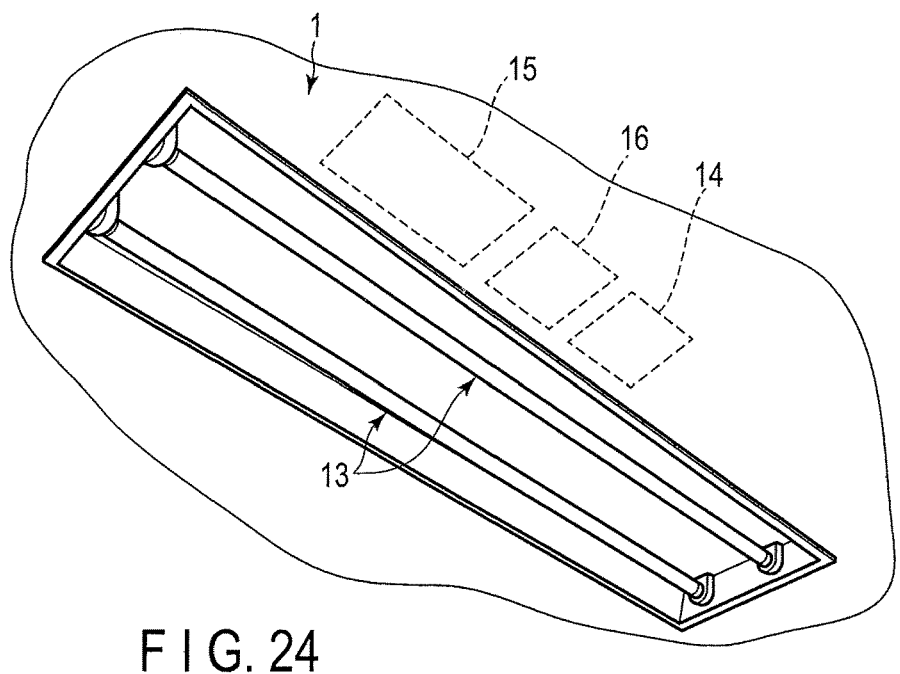
F I G. 24

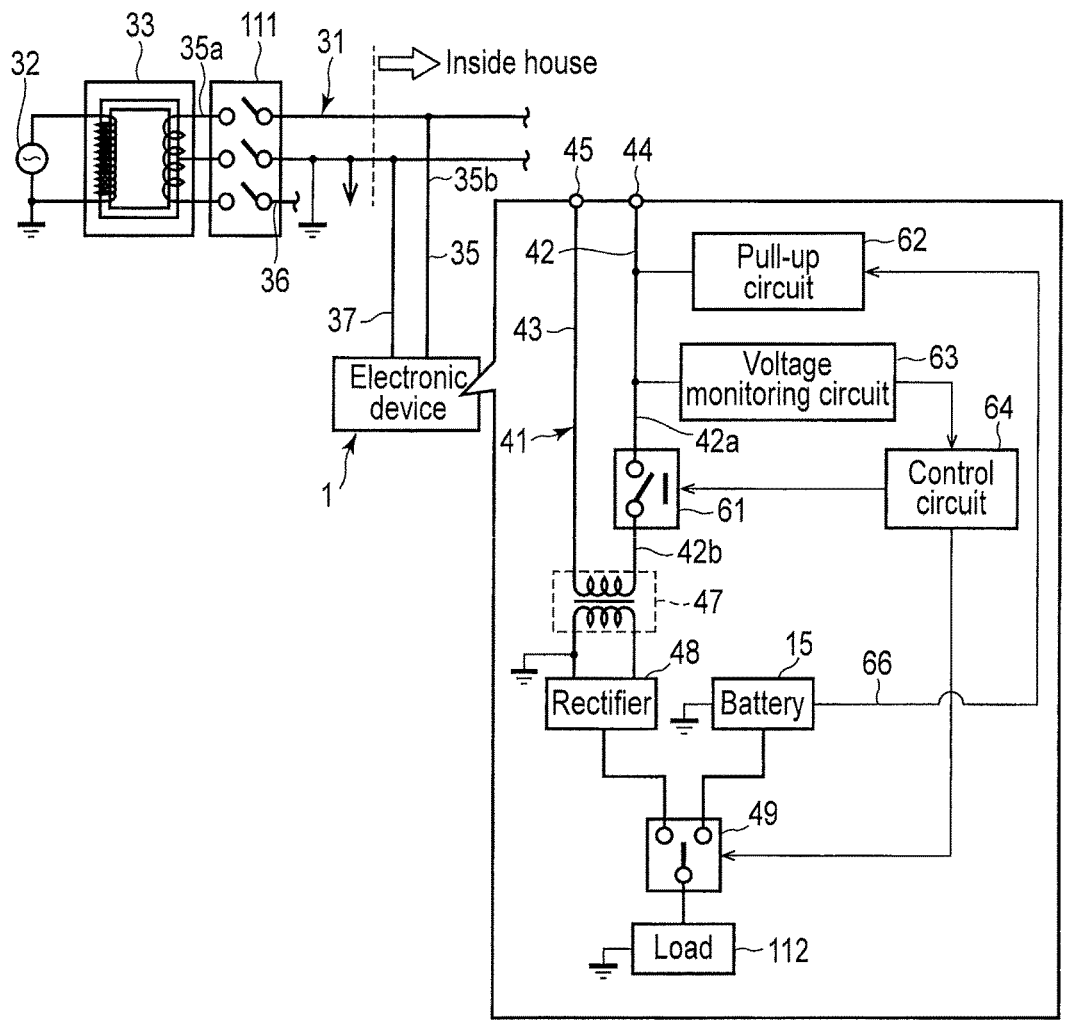
F I G. 25

ELECTRONIC DEVICE

CROSS REFERENCE TO RELATED APPLICATIONS

This application is a Continuation Application of PCT Application No. PCT/JP2014/083572, filed Dec. 18, 2014 and based upon and claiming the benefit of priority from Japanese Patent Application No. 2014-113385, filed May 30, 2014, the entire contents of all of which are incorporated herein by reference.

FIELD

Embodiments described herein relate generally to an electronic device.

BACKGROUND

Electronic devices supplied with electric power from batteries in the event of a power failure, for example, have been proposed.

BRIEF DESCRIPTION OF THE DRAWINGS

FIG. 2 is a cross-sectional view showing the electronic device seen along line F2-F2 in FIG. 1.

FIG. 3 is a cross-sectional view pictorially showing a function of a light guide unit of the electronic device shown in FIG. 1.

FIG. 4 is a block diagram showing a system configuration example of the electronic device shown in FIG. 1.

FIG. 5 is a block diagram showing a system configuration example of the electronic device shown in FIG. 1.

FIG. 8 is a block diagram showing an operation state of the electronic device shown in FIG. 1.

FIG. 9 is a block diagram showing an operation state of the electronic device shown in FIG. 1.

FIG. 10 is a block diagram showing an operation state of the electronic device shown in FIG. 1.

FIG. 11 is a block diagram showing an operation state of the electronic device shown in FIG. 1.

FIG. 12 is a graph showing an operation state of the electronic device shown in FIG. 1.

FIG. 13 is a block diagram showing a first modified example of the system configuration of the electronic device shown in FIG. 1.

FIG. 14 is a block diagram showing a second modified example of the system configuration of the electronic device shown in FIG. 1.

FIG. 16 is a block diagram showing a fourth modified example of the system configuration of the electronic device shown in FIG. 1.

FIG. 17 is a block diagram showing the fourth modified example of the system configuration of the electronic device shown in FIG. 1.

FIG. 18 is a block diagram showing a fifth modified example of the system configuration of the electronic device shown in FIG. 1.

FIG. 20 is a block diagram showing a modified example of the system configuration of the electronic device shown in FIG. 19.

FIG. 22 is a block diagram showing a system configuration example of an electronic device of a third embodiment.

FIG. 23 is a cross-sectional view showing an example of an electronic device of a fourth embodiment.

FIG. 24 is a perspective view showing an example of an electronic device of a fifth embodiment.

FIG. 25 is a block diagram showing a system configuration example of an electronic device of a sixth embodiment.

DETAILED DESCRIPTION

In general, according to one embodiment, an electronic device capable of switching power on and power off by a switch outside the electronic device, the electronic device includes a determination unit, a detection unit, an output unit, and a control unit. The determination unit determines whether power is supplied from an AC power source or not. The detection unit detects a conductive state of the switch. The control unit performs at least one of cutting off power to be supplied to the output unit, supplying power from the AC power source to the output unit, and supplying power from a second power source different from the AC power source to the output unit.

In the present specification, several elements are accompanied with plural examples of expressions. The examples of expressions are mere examples and do not deny the elements accompanied with the other expressions. In addition, elements which are not accompanied with plural expressions may also be represented by the other expressions.

First Embodiment

Figure 1:
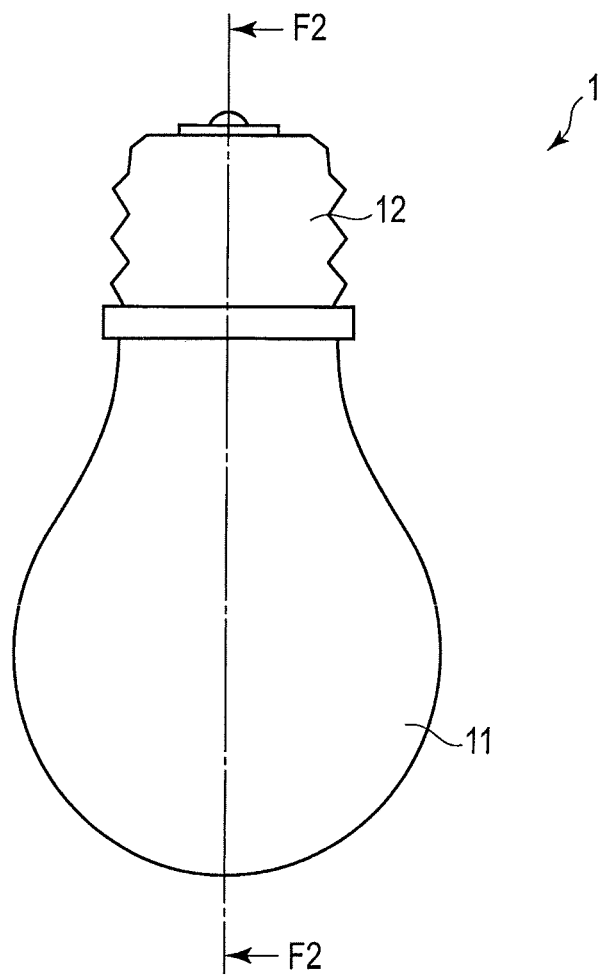
FIG. 1 is a front view showing an example of an electronic device of a first embodiment.

FIG. 1 to FIG. 12 show an electronic device 1 of a first embodiment. FIG. 1 shows an appearance of the electronic device 1. The electronic device 1 of the present embodiment is, for example, a lighting device. The configuration of the present embodiment is not limited to a lighting device, but can be widely applied to various electronic devices such as a ventilation fan and a blower.

The electronic device 1 is a light-emitting diode (LED) lamp used by being mounted in a socket provided on, for example, a room ceiling or the like. The electronic device 1 is not limited to the LED lamp, but may be, for example, a halogen lamp, an incandescent lamp, a fluorescent lamp or the like and is not particularly limited.

FIG. 2 shows a cross-section of the electronic device 1. The electronic device 1 comprises a globe 11, a base 12, a light emitting unit 13, a power source unit 14, a battery 15 and a control unit 16. In the following descriptions, a gravity direction is defined as a downward direction and a direction toward the ceiling is defined as an upward direction, with reference to the posture of the electronic device 1 mounted in the socket provided on the room ceiling.

The globe 11 emits light from the surface when the electronic device 1 functions as illumination. The globe 11 includes a heat transfer member 21 and a light guide unit 22.

The heat transfer member 21 is shaped in, for example, a general light bulb as shown in FIG. 2. More specifically, a spherical head portion 21a and a body portion 21b shaped in a truncated cone are integrally formed in the heat transfer member 21. The interior of the heat transfer member 21 is, for example, formed to be hollow. One of ends of the body portion 21b has an opening which allows the interior space of the heat transfer member 21 to communicate with the outside. The material of the heat transfer member 21 is preferably, for example, a metal material having excellent thermal conductivity such as aluminum. The heat transfer member 21 transfers heat emitted by the light emitting unit 13, inside the heat transfer member 21, and transmits part of the heat to the light guide unit 22.

The light guide unit 22 (light guide member) covers the heat transfer member 21 along the outer shape of the heat transfer member 21. The light guide unit 22 is, for example, a member having a light transmitting property such as glass or synthetic resin, and guides the light inside the unit. The shape of the light guide unit 22 has a spherical head portion 22a and a body portion 22b shaped in a truncated cone, similarly to the heat transfer member 21. Scattering marks which scatter light are formed by silk printing, cutting or the like on, for example, an entire outer or inner surface of the light guide unit 22.

The light emitting unit 13 (light source) comprises, for example, at least one light emitting element 13a such as an LED. As shown in FIG. 2, the light emitting element 13a is provided on, for example, an end surface of the base 12 and an outer surface of the heat transfer member 21 and is in contact with the light guide unit 22. In other words, the light emitting element 13a is positioned inside the light guide unit 22 and irradiates the interior of the light guide unit 22 with light. The light emitting unit 13 may be a substrate including at least one light emitting element 13a. The light emitting unit 13 is an example of each of a "load unit" and an "output unit" of the electronic device 1.

FIG. 3 pictorially shows a function of the light guide unit 22. The light emitted from the light emitting unit 13 travels straight or is refracted inside the light guide unit 22. The light which satisfies a total reflection condition at an interface between the light guide unit 22 and the external space, of the emitted light, transfers (propagates) inside the light guide unit 22 while repeating the total reflection at the interface between the light guide unit 22 and the external space, and the interface between the light guide unit 22 and the heat transfer member 21.

The light which is scattered by the scattering marks and does not satisfy the total reflection condition is emitted from the light guide unit 22 to the external space without being totally reflected at the interface between the light guide unit 22 and the external space. The light is thereby emitted from the outer surface of the light guide unit 22, i.e., the entire surface of the globe 11.

As shown in FIG. 2, the base 12 is an electrical and mechanical connection part for fixing the electronic device 1 in the socket by, for example, screwing. The base 12 is formed to be hollow, and an internal thread or an external thread for being mounted in the socket is provided on the surface of the base 12. The material of the base 12 is preferably a metal material having conductivity such as aluminum.

In the present embodiment, an example of a housing 24 (casing) of the electronic device 1 is formed by the globe 11 and the base 12. The power source unit 14, the battery 15 and the control unit 16 are accommodated in the housing 24. In the present embodiment, the battery 15 and the control unit 16 are located inside the globe 11. It should be noted that the battery 15 and the control unit 16 may be located inside the base 12 instead of the above-explained configuration. In addition, the power source unit 14 may be located inside the globe 11.

As shown in FIG. 2, the battery 15, in the interior of the globe 11, is located to be lower than, for example, the power source unit 14 and control unit 16. The battery 15 is a part which generates heat during charging and discharging. The air flowing around the electronic apparatus 1 is warmed by the electronic apparatus 1 to flow in a direction opposite to the gravity (i.e., upward direction) by natural convection. For this reason, if the battery 15 is provided at a position as lower as possible, inside the electronic device 1, heat radiation can easily be promoted by cooler air and the rise in temperature of the electronic device 1 can easily be suppressed.

Next, a system configuration of the electronic device 1 comprising the power source unit 14, the battery 15 and the control unit 16 will be explained. FIG. 4 pictorially shows the system configuration of the electronic device 1. Connection of the electronic device 1 to a general indoor line is exemplified here.

As shown in FIG. 4, the indoor line (hereinafter called a power source supply line 31) is supplied with an electric power from an external AC power source 32. The AC power source 32 is an example of each of "first power source", "external power source", and "commercial power source". A high voltage of 6,600V or the like of the AC power source 32 is converted into AC 100V or AC 200V by, for example, a pole transformer 33 (transformer) provided on a telephone pole outside the house and the power is supplied to the indoor power source supply line 31.

The electronic device 1 of the present embodiment is connected to the power source supply line 31 via, for example, a socket or the like and is supplied with the power from the AC power source 32 via the power source supply line 31. The electronic device 1 may be connected to the power source supply line 31 via, for example, a switch-equipped device (for example, an extension cord or a tap) and a receptacle, instead of a socket. In this case, the switch corresponds to an example of the "switch provided outside the device", similarly to a wall switch 34 which will be described later.

As shown in FIG. 4, the power source supply line 31 includes, for example, a hot wire 35 (first line or first wire), a cold wire 36, and a ground wire 37 (ground line, second line or second wire). The power source supply line 31 may include two lines alone, i.e., the hot wire 35 and the ground wire 37. In this case, the ground wire 37 may be referred to as a cold wire. In other words, the "first line" (first wire) is a wire supplied with an actual power (voltage). The "second line" (the second wire) is a wire which becomes a ground potential.

The switch 34 (manual switch) is provided in the middle of the power source supply line 31. The switch 34 is an example of a "switch provided outside the device" and is located outside the electronic device 1. The switch 34 is, for example, a wall switch provided on an indoor wall surface and is operable inside a house. The power source supply line 31 is switched to supply the AC power source 32 or cut off the supply by the switch 34.

The electronic device 1 is an example of a device which is connected to the power source supply line 31 and which is switched to supply the AC power source 32 or cut off the supply by the switch 34. The switch 34 can be, for example, operated manually by the user.

An example of the switch 34 is a single-cut type switch which performs conduction of the hot wire 35 alone, of the hot wire 35 and the ground wire 37 or cuts off the conduction. The switch 34 may be a double-pole type switch which performs conduction of both the hot wire 35 and the ground wire 37 or cuts off the conduction as shown in FIG. 22 described later. The switch 34 is not limited to the wall switch but may also be, for example, a switch with a strap hanging from the ceiling or a switch of other types.

In the following, the switch 34 is referred to as "wall switch 34" for convenience of description. In addition, a first portion 35a and a second portion 35b of the hot wire 35 are defined for convenience of description. The first portion 35a is a portion of the hot wire 35 which is located between the wall switch 34 and the AC power source 32. The second portion 35b is a portion of the hot wire 35 which is located between the wall switch 34 and the electronic device 1.

As shown in FIG. 4, the electronic device 1 comprises a power source line 41 electrically connected to the power source supply line 31. The power source line 41 includes a first line 42 (first power source line) and a second line 43 (second power source line). The first line 42 is electrically connected to the hot wire 35 of the power source supply line 31. That is, the first line 42 is connected to the AC power source 32 via the switch 34. A first connection 44 (first terminal) which is connected to the hot wire 35 is provided at an end of the first line 42. The first connection 44 is provided at, for example, a central portion of the end surface (bottom surface) of the base 12.

The second line 43 is electrically connected to the ground wire 37 of the power source supply line 31. A second connection 45 (second terminal) which is connected to the ground wire 37 is provided at an end of the second line 43. The second connection 45 is provided on, for example, an outer peripheral surface of the base 12.

The electronic device 1 comprises the power source unit 14, the battery 15 and the control unit 16 as described above. The power source unit 14 comprises a transformer 47 and a rectifier 48 (rectifying unit). The first line 42 and the second line 43 of the power source line 41 are connected to each other in the transformer 47. The transformer 47 is supplied with an alternating current via the power source line 41 and the power source supply line 31. The rectifier 48 converts the alternating current supplied to the transformer 47 into a direct current.

The battery 15 is an example of a "second power source", which is an internal power source (secondary battery) provided inside the electronic device 1. The battery 15 is charged with, for example, the direct current rectified by the rectifier 48 and can supply the power to the electronic device 1 as needed.

The power source unit 14 further comprises a power source switch 49 (power source switch). The power source switch 49 is positioned between the rectifier 48 and the battery 15, and a load, i.e., the light emitting unit 13. The power source switch 49 can switch supplying the power which is to be supplied to the light emitting unit 13 from the rectifier 48, supplying the power from the battery 15, and cutting off the power supply, based on the control signal from the control unit 16.

An example of the power source switch 49 can switch a first state of urging the rectifier 48 and the light emitting portion 13 to be conductive, a second state of urging the battery 15 and the light emitting unit 13 to be conductive, and a third state of urging the light emitting unit 13 and the both of the rectifier 48 and the battery 15 to be non-conductive. Instead of this, the power source switch 49 may be able to switch the first state of urging the rectifier 48 and the light emitting portion 13 to be conductive and the second state of urging the battery 15 and the light emitting unit 13 to be conductive. That is, since the power is not supplied from the rectifier 48 when the wall switch 34 is off, the power supplied to the light emitting unit 13 can be cut off even when the rectifier 48 and the light emitting unit 13 are conductive.

FIG. 4 pictorially shows the system configuration of the control unit 16. The control unit 16 is an example of the "controller" and the "device control device". The control unit 16 comprises a determination unit 51, a detection unit 52, and a control unit 53. The determination unit 51 is electrically connected to the first line 42 to determine the power supply or no supply from the AC power source 32. The detection unit 52 (state detection unit) is electrically connected to the first line 42 to detect the conductive state of the wall switch 34. The detection unit 52 detects the conductive state of the wall switch 34 via the power source supply line 31 when, for example, the determination unit 51 determines no supply from the AC power source 32. The control unit 53 can set any one of at least cutting off the power which is to be supplied to the electronic device 1 (for example, the power supplied to the light emitting unit 13), supplying the power from the AC power source 32, and supplying the power from the battery 15, based on the outputs from the determination unit 51 and the detection unit 52.

FIG. 5 shows a specific configuration example for implementation of the determination unit 51, the detection unit 52 and the control unit 53. The control unit 16 comprises a relay 61, a pull-up circuit 62, a voltage monitoring circuit 63, and a control circuit 64.

The relay 61 is an example of each of the "switching element" and the "changing unit" to change the conductive state of the first line 42, based on a control signal from the control circuit 64. More specifically, the relay 61 is inserted serially in the middle of the first line 42. The relay 61 is, for example, an electronically controlled relay but is not limited to this. When the relay 61 is closed (i.e., made to be conductive), the first line 42 becomes conductive. In contrast, when the relay 61 is opened (i.e., made to be non-conductive), the first line 42 is cut off. For this reason, when the relay 61 is opened while the wall switch 34 is off, the first line 42 and the hot wire 35 located between the relay 61 and the wall switch 34 become an opened state (floating state or a state in which the electric potential is not fixed).

In addition, a first portion 42a and a second portion 42b of the first line 42 are defined for convenience of description. The first portion 42a is a portion of the first line 42 which is located between the relay 61 and the first connection 44. The second portion 42b is a portion of the first line 42 which is located between the relay 61 and the transformer 47. The second portion 42b is connected to the ground wire 37 via the transformer 47 and the second line 43. When the relay 61 is opened, a portion between the first portion 42a of the first line 42 and the ground wire 37 is cut off. For this reason, when the relay 61 is opened when the wall switch 34 is off, the first portion 42a of the first line 42 and the second portion 35b of the hot wire 35 are opened.

The pull-up circuit 62 is electrically connected to the first portion 42a of the first line 42 to apply a predetermined DC voltage (for example, 3.3V) to the first portion 42a of the first line 42. The pull-up circuit 62 is an example of each of a "potential setting unit (potential setting circuit)" and a "setting unit", and sets the first line 42 between the relay 61 and the switch 34 to a predetermined potential (predetermined voltage) when no power is supplied from the AC power source 32. That is, the pull-up circuit 62 sets the first portion 42a of the first line 42 and the second portion 35b of the hot wire 35 to be at a predetermined potential if the relay 61 opened when the wall switch 34 is off.

As shown in FIG. 5, a third line 66 is connected between the pull-up circuit 62 and the battery 15. The pull-up circuit 62 is supplied with the DC power from the battery 15 via the third line 66. That is, the pull-up circuit 62 is, for example, a voltage source supplied with the voltage from the battery 15.

In contrast, when no power is supplied from the AC power source 32 and the wall switch 34 is on, the first portion 42a of the first line 42 is electrically connected to the transformer of the pole transformer 33 through the hot wire 35, and becomes conductive to a ground in view of the direct current. For this reason, the potential of the first line 42 becomes substantially the ground potential (approximately 0V) even if a predetermined voltage is applied to the first line 42 by the pull-up circuit 62. That is, the potential of the first line 42 is varied by switching of the wall switch 34.

Figure 6:
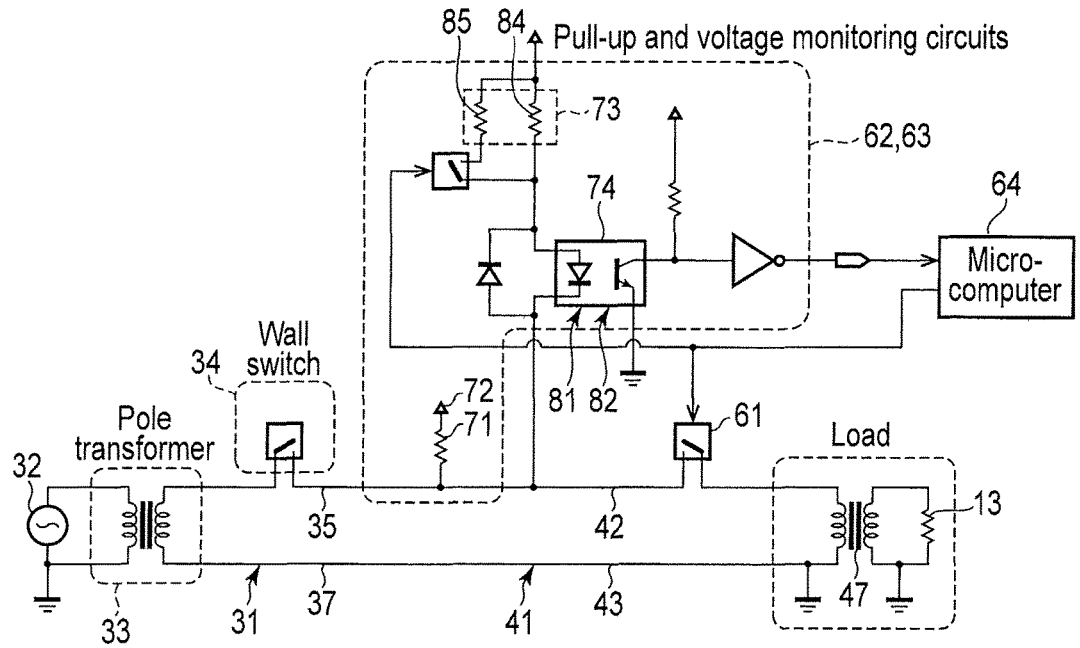
FIG. 6 is a block diagram showing examples of a pull-up and voltage monitoring circuit shown in FIG. 5.

FIG. 6 shows a further specific configuration example for implementation of the pull-up circuit 62 and the voltage monitoring circuit 63. The pull-up circuit 62 comprises a first resistor 71 (first resistive element) connected to the first line 42. The first resistor 71 is connected between a predetermined voltage terminal 72 and the first line 42. The voltage terminal 72 is supplied with, for example, a DC voltage from the battery 15 via the third line 66. The pull-up circuit 62 sets the first line 42 at a predetermined potential by, for example, applying a predetermined voltage to the first line 42 via the first resistor 71. In other words, the pull-up circuit 62 sets the hot wire 35 at a predetermined potential by applying a predetermined voltage to the hot wire 35 via the first line 42.

As shown in FIG. 5, the voltage monitoring circuit 63 is electrically connected to the first portion 42a of the first line 42. The voltage monitoring circuit 63 monitors the potential of the first portion 42a of the first line 42. In other words, the voltage monitoring circuit 63 detects the potential of the second portion 35b of the hot wire 35 via the first portion 42a of the first line 42. For example, the voltage monitoring circuit 63 outputs a logic signal of High when the electric potential is higher than or equal to a predetermined voltage level and outputs a logic signal of Low when the electric potential is lower than the predetermined voltage level.

More specifically, the voltage monitoring circuit 63 sends at least three types of logic signal corresponding to the potential state of the first line 42 to the control circuit 64. In other words, the voltage monitoring circuit 63 is an example of the "measuring unit", which measures the voltage of the first line 42 and outputs the measurement result. The measurement result is the voltage of the AC power source 32, the predetermined voltage set by the pull-up circuit 62 or the other voltage (third voltage).

More specifically, the voltage monitoring circuit 63 sends a first signal to the control circuit 64 when the power is supplied from the AC power source 32 to the first line 42. The first signal is, for example, a toggle signal corresponding to a frequency of the AC power source 32. It should be noted that "toggle signal" is a signal by which the first voltage (for example, High) and the second voltage (for example, Low) are repeated alternately. The toggle signal of the present embodiment is, for example, a signal by which the first voltage and the second voltage are changed alternately at a frequency of 50 Hz or 60 Hz.

The voltage monitoring circuit 63 sends a second signal to the control circuit 64 when the first portion 42a of the first line 42 is at the predetermined potential set by the pull-up circuit 62. The second signal is, for example, a signal fixed to the first voltage (for example, High).

On the other hand, the voltage monitoring circuit 63 sends a third signal to the control circuit 64 when the detection potential of the first portion 42a of the first line 42 is lower than the predetermined potential set by the pull-up circuit 62. In the present embodiment, the voltage monitoring circuit 63 sends the third signal to the control circuit 64 when the first line 42 has no substantial potential (i.e., the ground potential). The third signal is, for example, a signal fixed to the second voltage (for example, the Low).

As shown in FIG. 6, the voltage monitoring circuit 63 comprises a second resistor 73 (second resistive element) and a photo-coupler 74. The second resistor 73 is connected to the first line 42. An input unit of the photo-coupler 74 is, for example, connected serially between the second resistor 73 and the first line 42. On the other hand, an output unit of the photo-coupler 74 is connected to a microcomputer which is an example of the control circuit 64.

The photo-coupler 74 generates a High or Low binary detection voltage, based on the presence or absence of a current flowing through the second resistor 73. The photo-coupler 74 outputs the presence or absence of a current flowing through the second resistor 73 to the control circuit 64 as a detection signal. The control circuit 64 is an example of the "comparator" which compares the output of the photo-coupler 74 to a predetermined value.

As shown in FIG. 5, the control circuit 64 controls opening and closing of the relay 61, and the state of the power switch 49, in accordance with a content of a logic signal obtained from the voltage monitoring circuit 63. Specifically, the control circuit 64 determines that the power is supplied from the AC power source 32 when the first signal is input from the voltage monitoring circuit 63. More specifically, the control circuit 64 counts the number of edges of High and Low transition of the detection voltage within a predetermined time, and determines that the power is supplied from the AC power source 32 when the number is within a predetermined range or determines that no power is supplied from the AC power source 32 in the other case. The control circuit 64 controls the relay 61 to be closed when the supply from the AC power source 32 is determined. The control circuit 64 further sends a control signal to the power source switch 49 and controls the power source switch 49 to supply the power from the AC power source 32 to the light emitting unit 13.

In contrast, the control circuit 64 determines no supply from the AC power source 32 if the first signal is not input from the voltage monitoring circuit 63. In this case, the control circuit 64 controls the relay 61 to be opened. That is, when the pull-up circuit 62 applies the voltage to the hot wire 35 through the first line 42, the control circuit 64 control the relay 61 to change the conductive state between the first portion 42a of the first line 42 and the ground wire 37 (for example, to cut off). Then, the voltage monitoring circuit 63 detects the conductive state of the wall switch 34, based on the electric potential of the first line 42 (the electric potential of the hot wire 35), when the relay 61 is opened.

The control circuit 64 receives a logic signal from the voltage monitoring circuit 63 when the relay 61 is opened, and determines that the wall switch 34 is off (i.e., in a non-conductive state) when the second signal is input from the voltage monitoring circuit 63. In this case, the control circuit 64 controls the power source switch 49 to cut off the supply of the power to the light emitting unit 13.

In addition, the control circuit 64 receives a logic signal from the voltage monitoring circuit 63 when the relay 61 is opened, and determines that the wall switch 34 is on (i.e., in a conductive state) when the third signal is input from the voltage monitoring circuit 63. In this case, the control circuit 64 controls the power source switch 49 such that the power is supplied from the battery 15 to the light emitting unit 13.

According to the configuration example described above, the determination unit 51 is constituted by the voltage monitoring circuit 63 and a part of the control circuit 64. In addition, the detection unit 52 is constituted by the relay 61, the pull-up circuit 62, the voltage monitoring circuit 63, and a part of the control circuit 64. In other words, the determination unit 51 and the detection unit 52 share the voltage monitoring circuit 63 and control circuit 64. The control unit 53 is constituted by a part of the control circuit 64.

In addition, the determination unit 51 comprises a voltage variation detection unit 81 which detects a voltage variation of the first line 42 by the second resistor 73, the photo-coupler 74 and the like and determines the supply or no supply from the AC power source 32 by detecting the voltage variation within a predetermined time. The detection unit 52 comprises an electric potential detection unit 82 which detects the conductive state of the wall switch 34, based on the electric potential set by the pull-up circuit 62, by the second resistor 73, the photo-coupler 74, and the like. That is, the voltage variation detection unit 81 and the potential detection unit 82 share the second resistor 73 and the photo-coupler 74.

As shown in FIG. 6, the resistance of the second resistor 73 can be changed according to the presence or absence of supply of the AC power source 32. A resistance of the second resistor 73 is variably controlled by the control unit 53 to be smaller when there is no supply from the AC power source 32, as compared with, for example, a state in which the AC power source 32 is supplied.

More specifically, the second resistor 73 comprises, for example a first resistive element 84 and a second resistive element 85 electrically connected in parallel. A resistance of the first resistive element 84 is greater than a resistance of the second resistive element 85.

The second resistor 73 is, for example, constituted by the first resistive element 84 alone, and the resistance is comparatively great, at a normal time. For this reason, for example, even when the AC voltage of 100V is supplied, the flowing current can be suppressed to be comparatively small.

In contrast, if no supply from the AC power source 32 is determined, the control circuit 64 controls the second resistor 73 to connect the first resistive element 84 and the second resistive element 85 in parallel. Accordingly, the resistance of the second resistor 73 becomes smaller than in a case where the second resistor 73 is constituted by the first resistive element 84 alone. For this reason, for example, even if the DC voltage of 3.3V is supplied, the value of the current flowing can be set to a magnitude suitable for detection. The control signal of the control circuit 64 for controlling the second resistor 73 may be, for example, the same as (synchronized with) the control signal for controlling the relay 61.

Figure 7:
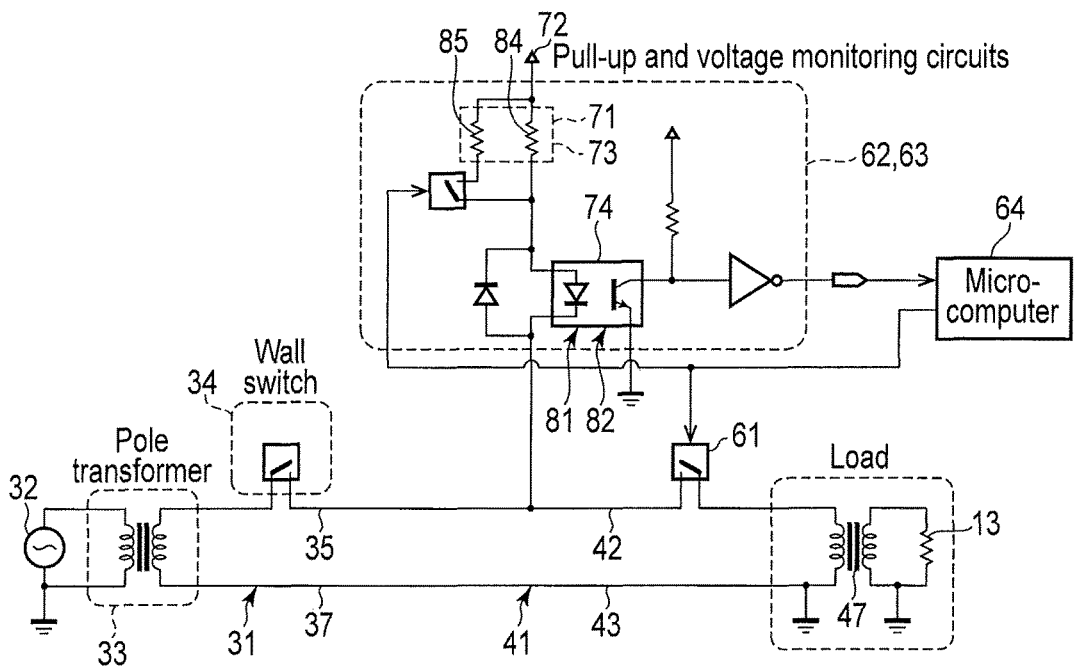
FIG. 7 is a block diagram showing modified examples of the pull-up and voltage monitoring circuit shown in FIG. 5.

FIG. 7 shows modified examples of the pull-up circuit 62 and the voltage monitoring circuit 63. In the modified example, the first resistor 71 and the second resistor 73 are integrated into one resistor unit. More specifically, the first resistor 71 and second resistor 73 share at least one resistive element 84. In the present embodiment, the first resistor 71 and second resistor 73 share the first resistive element 84 and the second resistive element 85. According to the configuration, substantially the same functions as those of the configuration shown in FIG. 6 can be implemented, and the number of components can be reduced.

Next, the operation of the electronic device 1 will be explained.

[If the Wall Switch 34 is On at Normal Time]

FIG. 8 illustrates the operation of the electronic device 1 in a case where the wall switch 34 is turned on at a normal time. If there is supply from the AC power source 32, the voltage monitoring circuit 63 sends the first signal (toggle signal) to the control circuit 64, based on the AC power source 32. The control circuit 64 determines that there is the supply from the AC power source 32 by receiving the first signal, and controls the relay 61 to become in the closed state. Furthermore, the control circuit 64 controls the power source switch 49 such that the power is supplied from the AC power source 32 to the light emitting unit 13. Accordingly, the light emitting unit 13 can be supplied with the power from the AC power source 32 and emit the light. In the present specification, the "normal time" means a case where there is supply from the AC power source 32.

[If the Wall Switch 34 is Off at Normal Time]

FIG. 9 illustrates the operation of the electronic device 1 in a case where the wall switch 34 is off at the normal time. If the supply from the AC power source 32 is cut off by the wall switch 34, the first signal is not input from the voltage monitoring circuit 63 to the control circuit 64. The control circuit 64 determines that there is no supply from the AC power source 32 due to no input of the first signal, and controls the relay 61 to be opened.

The pull-up circuit 62 applies a predetermined DC voltage to the first portion 42a of the first line 42 when the relay 61 is opened. When the wall switch 34 is off, as described above, the first portion 42a of the first line 42 and the second portion 35b of the hot line 35 are in the opened state and are set to a predetermined potential by the pull-up circuit 62.

The voltage monitoring circuit 63 detects the electric potential of the first line 42 and, sends the second signal (for example, a signal fixed to High) to the control circuit 64 if the predetermined potential set by the pull-up circuit 62 is detected. The control circuit 64 controls the power source switch 49 to cut off the supply of the power to the light emitting unit 13, based on the second signal. The light emitting unit 13 is thereby turned off.

[If the Wall Switch 34 is On in the Event of Power Failure]

FIG. 10 shows the operation of the electronic device 1 in a case where the wall switch 34 is on in the event of a power failure. If no power is supplied from the AC power source 32 in the event of a power failure, the first signal is not input from the voltage monitoring circuit 63 to the control circuit 64. The control circuit 64 determines that no power is supplied from the AC power source 32 due to no input of the first signal, and controls the relay 61 to be opened.

The pull-up circuit 62 applies a predetermined DC voltage to the first portion 42a of the first line 42 when the relay 61 is opened. When the wall switch 34 is on, as described above, the first portion 42a of the first line 42 is electrically connected to the transformer of the pole transformer 33 through the hot wire 35 and becomes conductive to a ground in view of the direct current. For this reason, the first line 42 becomes the ground potential even when the predetermined voltage is applied by the pull-up circuit 62.

The voltage monitoring circuit 63 detects the electric potential of the first line 42 and, sends the third signal (for example, a signal fixed to Low) to the control circuit 64 if the predetermined potential set by the pull-up circuit 62 is not detected. The control circuit 64 controls the power source switch 49 to supply the power from the battery 15 to the light emitting unit 13, based on the third signal. The light emitting unit 13 can be thereby supplied with the power from the battery 15 and emit the light.

[If the Wall Switch 34 is Off in the Event of Power Failure]

FIG. 11 illustrates the operation of the electronic device 1 in a case where the wall switch 34 is off in the event of a power failure. If the wall switch 34 is off in the event of power failure, the power is not supplied from the AC power source 32. If no power is supplied from the AC power source 32 in the event of a power failure, the first signal is not input from the voltage monitoring circuit 63 to the control circuit 64. The control circuit 64 determines that no power is supplied from the AC power source 32 due to no input of the first signal, and controls the relay 61 to be opened.

The pull-up circuit 62 applies a predetermined DC voltage to the first portion 42a of the first line 42 when the relay 61 is opened. When the wall switch 34 is off, as described above, the first portion 42a of the first line 42 and the second portion 35b of the hot line 35 are in the opened state and are set to a predetermined potential by the pull-up circuit 62.

The voltage monitoring circuit 63 detects the electric potential of the first line 42 and, sends the second signal (for example, a signal fixed to High) to the control circuit 64 if the predetermined potential set by the pull-up circuit 62 is detected. The control circuit 64 controls the power source switch 49 to cut off the supply of the power to the light emitting unit 13, based on the second signal. The light emitting unit 13 is thereby turned off.

FIG. 12 illustrates an example of the operation state of the electronic device 1. As shown in FIG. 12, the voltage monitoring circuit 63 outputs three types of control signals in accordance with the power supply or no supply from the AC power source 32 and the conductive state or nonconductive state of the wall switch 34.

According to the above configuration, the electronic device 1 capable of attempting to enhance the convenience of use can be provided. Several electronic devices will be reviewed for comparison. For example, a device which switches the lighting and extinction, with radio control signals from a remote controller, will be considered. In this device, when the illumination is turned on as emergency light in the event of a power failure, the user needs to look for the remote controller terminal in the dark and send a signal.

In addition, a device which recognizes general extinction by a special sequence will be considered. In this device, the general extinction and the cutoff in the event of a power failure are distinguished by forcing the wall switch to be turned off by a specific sequence. In this case, the user needs to be charged to perform a complicated work different from that for a conventional lighting device at a normal time.

In addition, an electronic device which determines both the loss of power supplied from an external power source, and cutoff of the power supply performed by a switch connected between the external power source and the electronic device, based on the difference in transition of voltage variation, will be considered. In this case, once a power failure is determined and the operation is switched to a battery operation, arbitrary extinction and lighting operations cannot be performed.

In contrast, the electronic device 1 of the present embodiment comprises the determination unit 51 which determines the power supply or no supply from the AC power source 32, the detection unit 52 which detects the conductive state of the wall switch 34, the second power source (battery) 15 different from the AC power source 32, and the control unit 53. The control unit 53 determines, based on the outputs of the determination unit 51 and the detection unit 52, whether the power supplied to the electronic device 1 is at least cut off, the power is supplied from the AC power source 32, or the power is supplied from the second power source 15.

According to this configuration, since the electronic device 1 can detect by itself the conductive state or nonconductive state of the switch 34, for example the power of the electronic device 1 can be switched to ON or OFF by the switch 34 in the even of a power failure, in the same manner as that at the normal time. The user can thereby use the electronic device 1 without noticing the presence or absence of a power failure. This improves the convenience of use of the electronic device 1.

In addition, according to the electronic device 1 of the present embodiment, the system having the above-described function can be implemented by exchanging the conventional device with the electronic device 1, without any special construction or device on an indoor side. In view of this point, too, the electronic device 1 is considered to have much convenience of use.

In the present embodiment, the electronic device 1 is an illumination device further comprising the light emitting unit 13 supplied with the power from the AC power source 32 or the second power source 15. In this configuration, emergency illumination having high safety, which is used as normal illumination at a normal time but puts substantially no burden on the user in the event of a power failure, can be implemented.

In the present embodiment, the electronic device 1 is connected to the power source supply line 31 in which the switch 34 is provided in the middle and which is supplied with the power from the AC power source 32. The detection unit 52 detects the conductive state of the switch 34 via the power source supply line 31 when the determination unit 51 determines no supply from the AC power source 32. According to this configuration, since the conductive state of the switch 34 is detected by using the power source supply line 31, a special detecting device does not need to be added to the switch 34, and the conventional switch 34 and the convenient power source supply line 31 can be used as they are.

In the present embodiment, the detection unit 52 detects the conductive state of the switch 34 by applying a predetermined voltage to the power source supply line 31 and detecting the electric potential of the power source supply line 31. According to this configuration, the conductive state of the switch 34 can be detected by a comparatively simple configuration. The costs for the electronic device 1 can be thereby reduced.

In the present embodiment, the detection unit 52 determines that the switch 34 is in the conductive state when the detection result of the electric potential is lower than the predetermined voltage by a predetermined amount or more. According to such a configuration, the conductive state of the switch 34 can be detected with a comparatively good accuracy.

In the present embodiment, the electronic device 1 comprises the switching element (relay 61) which varies the conductive state of the power source line 41 and ground line 37 when the detection unit 52 applies the predetermined voltage to the hot wire 35 through the power source line 41. According to such a configuration, the detection accuracy of the conductive state of the switch 34 can be further improved.

In the present embodiment, the detection unit 52 comprises the relay 61 provided in the middle of the power source line 41 and opened when the determination unit 51 determines no AC power source 32, the electric potential setting unit (the pull-up circuit 62) which sets a predetermined potential to the power source line 41 between the relay 61 and the switch 34, and the potential detection unit 82 which detects the conductive state of the switch 34, based on the electric potential set by the potential setting unit 62. According to this configuration, the conductive state of the switch 34 can be detected with a good accuracy by a comparatively simple configuration.

In the present embodiment, the potential setting unit 62 is supplied with the power from the second power source 15. According to such a configuration, the number of components necessary for the electronic device 1 can be reduced and the costs for the electronic device 1 can also be reduced.

In the present embodiment, the determination unit 51 comprises the voltage variation detection unit 81 which detects a voltage variation of the power source line 41, and determines the power supply or no supply from the AC power source 32 by detecting the voltage variation within a predetermined time. According to this configuration, the presence or absence of the AC power source 32 can be detected with a good accuracy by a comparatively simple configuration.

In the present embodiment, the voltage variation detection unit 81 and the potential detection unit 82 share the resistor 73 connected to the power source line 41, and the photo-coupler 74 which detects the current flowing through the resistor 73 and outputs the detection signal to the control unit 53. According to such a configuration, the number of components necessary for the electronic device 1 can be reduced and the costs for the electronic device 1 can also be reduced. Furthermore, the power source circuit to which a comparatively high voltage is applied, and the logic circuit to which a comparatively low voltage is applied can be electrically insulated from each other by using the photo-coupler 74. According to this configuration, the reliability of the electronic device 1 can be increased.

In the present embodiment, the resistance of the second resistor 73 is variably controlled by the control unit 53 to be smaller when there is no supply from the AC power source 32, as compared with the case there is supply from the AC power source 32. According to such a configuration, the current flowing through the second resistor 73 can be reduced when there is supply from the AC power source 32, and the current for detection can be set not to be excessively small when there is no supply from the AC power source 32. The detection accuracy of the detection unit 52 can be thereby increased.

In terms of the present embodiment in another aspect, the electronic device 1 is an electronic device which can be driven by a commercial power source (AC power source 32) connected via the switch 34 and which can also be driven by the second power source (battery 15), and comprises the control means (control unit 16) for controlling the driving power in accordance with presence or absence of the voltage from the commercial power source and the state of the switch 34. According to this configuration, the user can operate the power of the electronic device 1 to be ON/OFF by simply operating the switch 34, regardless of the supply from the AC power source 32. This improves the convenience of use of the electronic device 1.

In the present embodiment, the control means uses the commercial power source as the driving power source if the switch 34 is conductive and the voltage is supplied from the commercial power source, uses the second power source as the driving power source if the switch 34 is conductive and no voltage is supplied from the commercial power source, and cuts off the driving power source if the switch 34 is non-conductive.

In the present embodiment, the control means comprises the setting unit (pull-up circuit 62), the measuring unit (voltage monitoring circuit 63), and the switching element (relay 61). The setting unit sets the line 42 connected to the commercial power source via the switch 34 to a predetermined voltage if no voltage is supplied from the commercial power source. The measuring unit measures the voltage of the line, and outputs the measurement result of the voltage of the commercial power source, the predetermined voltage or the other voltage (third voltage). The switching element is provided in the middle of the line, and is made conductive if the measurement result of the measuring unit is the voltage of the commercial power source. According to this configuration, the conductive state of the switch 34 can be detected by a comparatively simple configuration.

In the present embodiment, the control means uses the commercial power source as the driving power source when the measurement result of the measuring unit is the voltage of the commercial power source, and uses the second power source as the driving power source when the measurement result of the measuring unit is the third voltage.

The electronic device 1 according to several modified examples and other embodiments will be hereinafter described. The constituent elements having functions which are the same as or similar to those of the first embodiment will be denoted by the same reference numbers and explanations are omitted. Constituent elements other than those described below are the same as those in the first embodiment.

First Modified Example

FIG. 13 shows the electronic device 1 of a first modified example of the first embodiment. In this modified example, a transistor 91 is provided instead of the relay 61. The transistor 91 is, for example, an FET type transistor, but may be, for example, a bipolar type transistor and is not particularly limited. The transistor 91 is an example of each of the "switching element" and the "changing unit", and changes the conductive state of the first portion 42a of the first line 42 and the ground wire 37 when the detection unit 52 applies a predetermined voltage to the hot wire 35 through the power source line 41.

Specifically, the control circuit 64 sends a control signal to the transistor 91 according to the output of the voltage monitoring circuit 63 and changes the conduction state of the first line 42. That is, the control circuit 64 controls the transistor 91 to set the first line 42 in a conductive state when the power is determined to be supplied from the AC power source 32. In contrast, the control circuit 64 controls the transistor 91 to set the first line 42 in a non-conductive state when the power is not determined to be supplied from the AC power source 32. According to this configuration, too, substantially the same functions as those of the configuration of the above-described first embodiment can be implemented.

Second Modified Example

FIG. 14 shows the electronic device 1 of a second modified example of the first embodiment. In this modified example, a conductive state changing unit 93 is provided instead of the relay 61. The conductive state changing unit 93 is an example of each of the "switching element" and the "changing unit", and can vary the resistance of the first line 42.

More specifically, the control circuit 64 sends a control signal to the conductive state changing unit 93 in accordance with the output of the voltage monitoring circuit 63 and changes the conductive state of the first line 42. That is, if the power is determined to be supplied from the AC power source 32, the control circuit 64 controls the conductive state to a first state in which the resistance of the conductive state changing unit 93 is substantially zero. In contrast, if it is determined that no power is supplied from the AC power source 32, the control circuit 64 controls the conductive state to a second state in which the resistance of the conductive state changing unit 93 is greater than that in the first state. According to this configuration, too, substantially the same functions as those of the configuration of the above-described first embodiment can be implemented.

Third Modified Example

Figure 15:
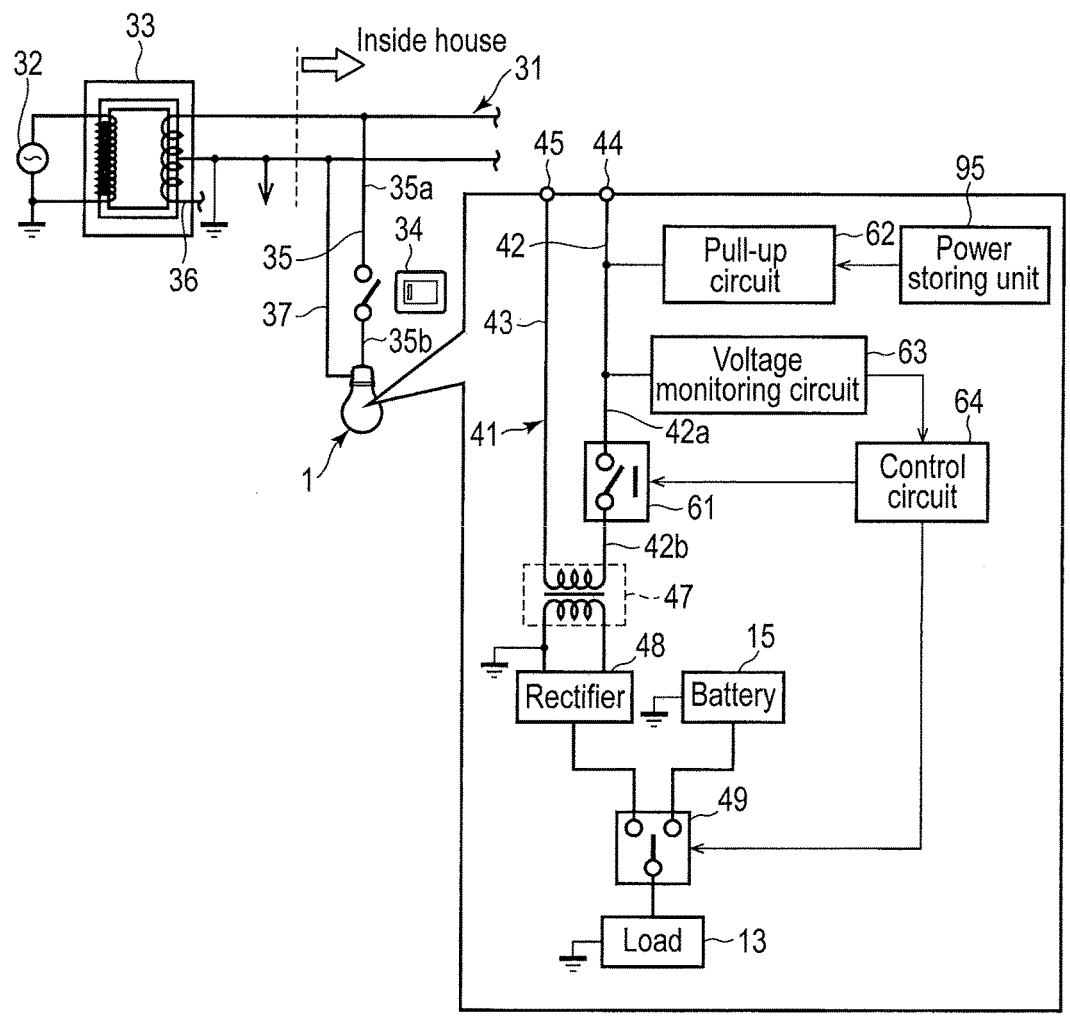
FIG. 15 is a block diagram showing a third modified example of the system configuration of the electronic device shown in FIG. 1.

FIG. 15 shows the electronic device 1 of a third modified example of the first embodiment. In this modified example, the electronic device 1 comprises another power storage unit 95 in addition to the battery 15. The power storage unit 95 is an example of a "third power source". The power storage unit 95 has, for example, an output voltage smaller than the battery 15. The power storage unit 95 may be the second battery provided inside the electronic device 1 but may be, for example, a capacitor or the like.

In this modified example, the pull-up circuit 62 is supplied with the power from the power storage unit 95 instead of the battery 15. According to this configuration, too, substantially the same functions as those of the configuration of the above-described first embodiment can be implemented. In addition, the battery 15 capable of outputting a comparatively large voltage and the power storage unit 95 which may output a comparatively smaller output voltage can easily be optimized, and the efficiency of operation of the electronic device 1 can be improved, by separating the battery 15 which supplies the power to the light emitting unit 13 and the power storage unit 95 which supplies the power to the pull-up circuit 62 as described in the present modified example. This also contributes to reduction in power consumption of the electronic device 1, and the like.

Fourth Modified Example

FIG. 16 and FIG. 17 show the electronic device 1 of a fourth modified example of the first embodiment. The electronic device 1 of this modified example comprises a polarity switching unit 97. The polarity switching unit 97 is inserted serially in the middle of the first line 42 and the middle of the second line 43 to switch connection of the first line 42 and the second line 43, and the first connection 44 and the second connection 45.

More specifically, FIG. 16 shows a case where the first connection 44 is connected to the hot wire 35 while the second connection 45 is connected to the ground wire 37. In this case, the polarity switching unit 97 causes the first connection 44 and the first line 42 to be connected (conductive) and causes the second connection 45 and the second line 43 to be connected (conductive).

In contrast, according to the configuration of the socket or the like, the hot wire 35 and the ground wire 37 are often arranged oppositely, the first connection 44 is connected to the ground wire 37, and the second connection 45 is connected to the hot wire 35 as shown in FIG. 17. In this case, since the first line 42 becomes connected to the ground via the ground wire 37, the electric potential can hardly be set to the first line 42 by the pull-up circuit 62. Thus, in this case, the polarity switching unit 97 switches the polarities of the first line 42 and the second line 43 to cause the second connecting 45 and the first line 42 to be connected (conductive), and the first connection 44 and the second line 43 to be connected (conductive).

Next, the operation of the electronic device 1 will be explained.

The polarity switching unit 97 connects the first connection 44 and the first line 42, and connects the second connection 45 and the second line 43, at the time of, for example, shipment. The electronic device 1 is attached to, for example, the socket when the switch 34 is off, at a normal time. The control circuit 64 receives a logic signal from the voltage monitoring circuit 63, similarly to the first embodiment, and opens the relay 61 if the first signal is not input.

Then, the control circuit 64 receives the logic signal from the voltage monitoring circuit 63 when the relay 61 is opened and, if the second signal is input, determines that the first line 42 is connected to the hot wire 35 and that the second line 43 is connected to the ground wire 37, and maintains the state of the polarity switching unit 97 as it is.

In contrast, if the third signal is input instead of the second signal, the control circuit 64 determines that the first line 42 may be connected to the ground wire 37 and that the second line 43 may be connected to the hot wire 35, controls the polarity switching unit 97, and automatically switches the polarities of the first line 42 and the second line 43. In this state, the control circuit 64 receives the logic signal from the voltage monitoring circuit 63 and, if the second signal is input, determines that the first line 42 is connected to the hot wire 35 and that the second line 43 is connected to the ground wire 37, and maintains the state of the polarity switching unit 97 as it is.

As described above, the electronic device 1 of the present modified example comprises the polarity switching unit 97 which switches the power source line 41 so as to connect the first line 42 to the hot wire 35 and connect the second line 43 to the ground wire 37. According to such a configuration, the electronic device 1 can also be used if the hot wire 35 and the ground wire 37 are arranged oppositely in accordance with the configuration such as the socket or the like. This further improves the convenience of use of the electronic device 1.

In the present embodiment, the control unit 53 automatically switches the polarity switching unit 97 in response to the voltage level applied to the power source line 41. According to such a configuration, the user is not required to perform a special operation even if the hot wire 35 and ground wire 37 are arranged oppositely. This further improves the convenience of use of the electronic device 1.

Fifth Modified Example

FIG. 18 shows the electronic device 1 of a fifth modified example of the first embodiment. In the present modified example, the detection unit 52 detects the state of the wall switch 34 by allowing a predetermined signal to flow to the first line 42 and monitoring the reflected state of the signal, instead of monitoring the electric potential set to the first line 42.

More particularly, the detection unit 52 comprises a signal generating unit 101 and a signal detecting unit 102. The signal generating unit 101 outputs a predetermined signal (test signal) to the first line 42. At this time, when the wall switch 34 is in a conductive state, the signal is not reflected but flows to the hot wire 35. In this case, the wall switch 34 is determined to be in the conductive state if the signal detecting unit 102 does not detect reflection of the signal.

In contrast, when the wall switch 34 is in a non-conductive state, the signal is reflected at the wall switch 34 and returns to the first line 42. In this case, the wall switch 34 is determined to be in the non-conductive state if the signal detecting unit 102 detects the above-explained reflected signal. According to this configuration, too, substantially the same functions as those of the configuration of the above-described first embodiment can be implemented.

Second Embodiment

Figure 19:
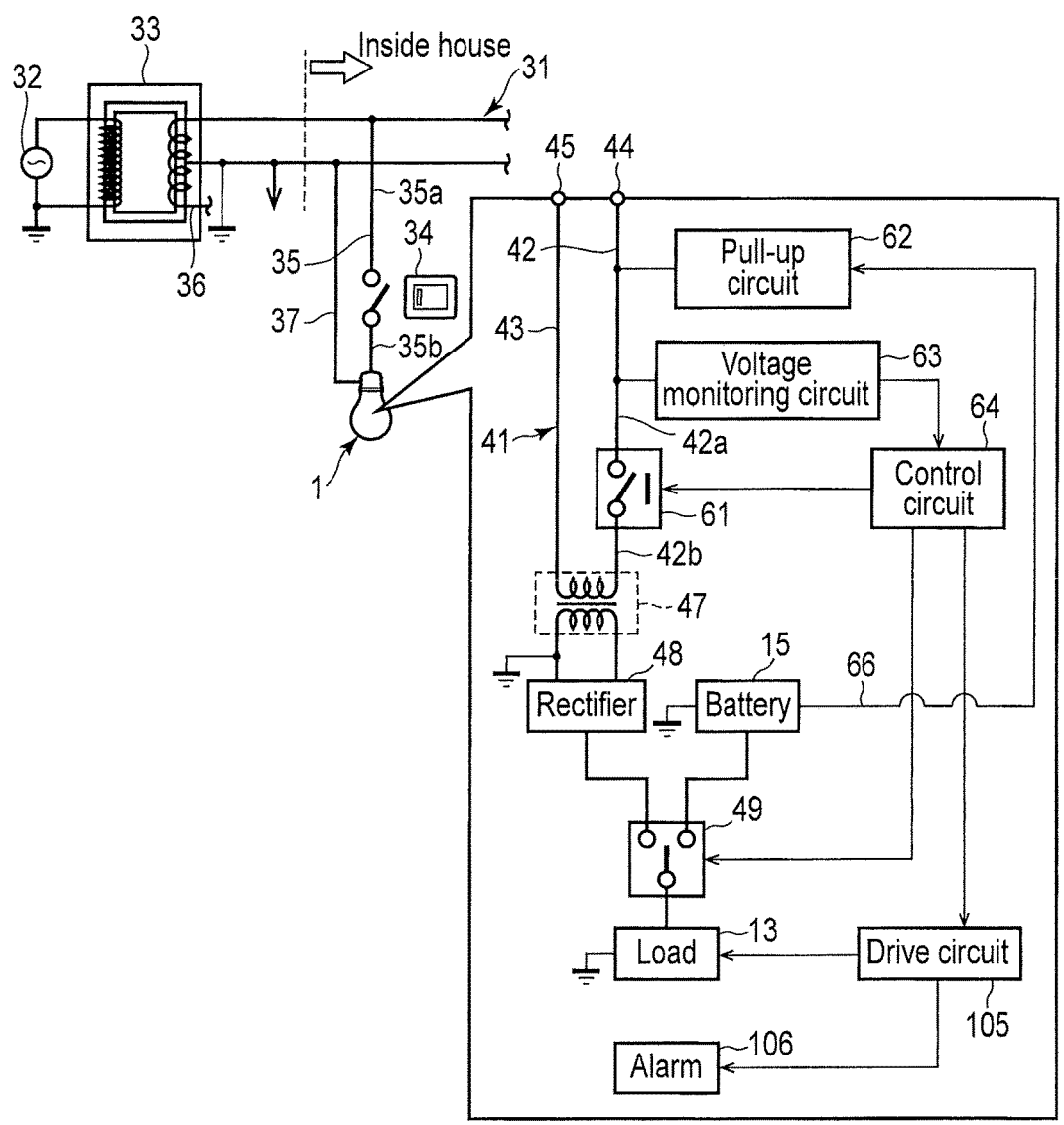
FIG. 19 is a block diagram showing a system configuration example of an electronic device of a second embodiment.

FIG. 19 shows an electronic device 1 of a second embodiment. The electronic device 1 of the present embodiment changes a light emission mode of the light emitting unit 13 to notify the user of, for example, a power failure condition, when the power is supplied from the battery 15.

More particularly, the control unit 53 comprises a drive circuit 105 (drive unit) which drives the light emitting unit 13. If it is determined that the power is supplied from an AC power source 32, the control circuit 64 controls the power source switch 49 such that the power is supplied from the AC power source 32 to the light emitting unit 13, and controls the drive circuit 105 such that the light emitting unit 13 emits light in a first mode (first emission mode or general mode). The first mode is a lighting mode at a normal time or a mode in which, for example, light emission of the light emitting unit 13 continues similarly to a general bulb.

On the other hand, if it is determined that no power is supplied from the AC power source 32, the control circuit 64 controls the power switch 49 such that the power is supplied from the battery 15 to the light emitting unit 13, and controls the drive circuit 105 such that the light emitting unit 13 emits light in a second mode (second emission mode or power failure mode). The second mode is a mode for notifying the user of, for example, a power failure condition.

The second mode includes, for example, an operation of urging the light emitting unit 13 to flash at least once. The second mode may cause the light emitting unit 13 to blink, for example, when the power supply to the light emitting unit 13 is switched from the AC power source 32 to the battery 15, or may cause the light emitting unit 13 to flash at predetermined time intervals. The second mode may also be a lighting mode of reducing power consumption as compared with, for example, the first mode. The second mode is, for example, a lighting mode of reducing brightness as compared with, for example, the first mode. That is, the second mode may notify the user of a power failure condition by reducing the brightness as compared with, for example, the first mode.

The driving circuit 105 may implement the second mode (blinking, reduction of light amount, and the like) by controlling the light emitting unit 13 or may implement the second mode (flashing and the like) by controlling the power source switch 49.

The electronic device 1 of the present embodiment may further comprise an alarm 106 which notifies the user of, for example, a power failure condition. The alarm 106 may be a speaker which rings when the power supply to the light emitting unit 13 is switched from the AC power source 32 to the battery 15, another light emitting unit which exhibits a different color, or the like. The control circuit 64 controls the driving circuit 105 to actuate the alarm 106 when, for example, the power supply to the light emitting unit 13 is switched from the AC power source 32 to the battery 15.

In this configuration, the convenience of use of the electronic device 1 can be further improved. That is, according to an electronic device which can be used in normal times and in the event of a power failure, the user may hardly be notified that a power failure has occurred. Thus, in the present embodiment, the control unit 53 controls the light emitting unit 13 so as to emit light in a first emission mode when the power is supplied from the AC power source 32 and to emit light in a second emission mode when the power is supplied from the second power source 15. According to this configuration, the user can easily be notified that a power failure has occurred, by looking at the light emission of the second emission mode.

In the present embodiment, the second emission mode includes an operation of urging the light emitting unit 13 to flash at least once. According to this configuration, the user can easily be notified that a power failure has occurred. The convenience of use of the electronic device 1 can be thereby further improved.

Modified Example

Figure 21:
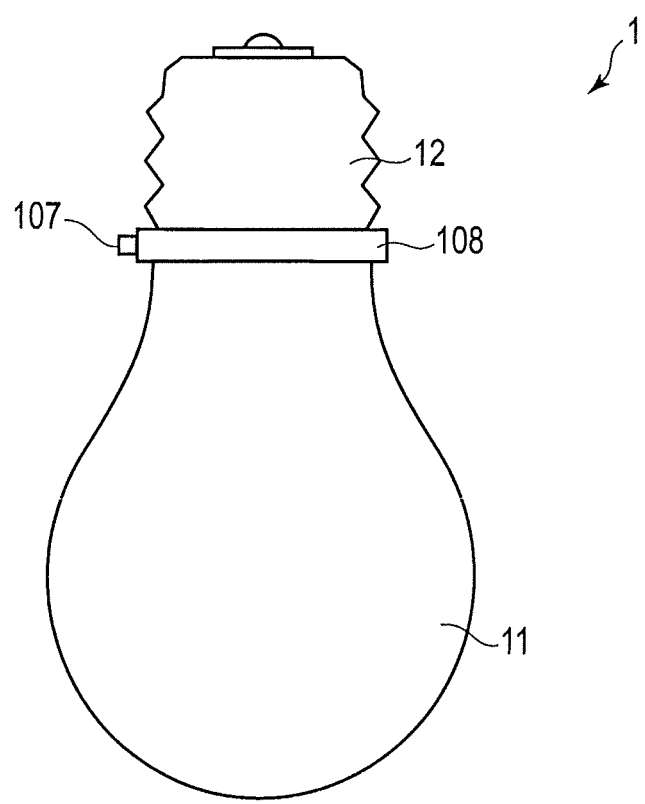
FIG. 21 is a front view showing an example of the electronic device shown in FIG. 20.

FIG. 20 and FIG. 21 show the electronic device 1 of a modified example of the second embodiment. The electronic device 1 of the present modified example comprises an adjustment unit 107 which can adjust the lighting state of the second mode of the light emitting unit 13. More specifically, the adjustment unit 107 is, for example, a rotary knob exposed to the outside of the electronic device 1 and can be directly operated by the user. The adjustment unit 107 is provided on, for example, an outer peripheral surface of a globe connector 108 connected between the globe 11 and the base 12.

The electronic device 1 allows the lighting mode of the light emitting unit 13 to be changed by operating the adjustment unit 107. The user can adjust the brightness of the lighting of the second mode by, for example, operating the adjustment unit 107. That is, the user can select by himself a mode (first power mode) in which the light emitting unit 13 emits light brightly but the duration of the battery 15 is relatively short, and a mode (second power mode or power saving mode) in which the brightness of the light emitting unit 13 is reduced as compared with the above mode but the duration of the battery 15 is relatively long. Note that the second power mode may be set at multiple steps as compared with the first power mode or may be set to be changeable, continuously and sleeplessly, to the brightness different from the first power mode.

In this configuration, the electronic device 1 can be used effectively according to various conditions since the user can adjust the duration of the battery 15 by him. The convenience of use of the electronic device 1 can be thereby further improved.

Third Embodiment

FIG. 22 shows an electronic device 1 of a third embodiment. In the present embodiment, the wall switch 34 is a double-pole type which cuts off both the hot wire 35 and the ground wire 37. In the electronic device 1 of the present embodiment, the relay 61 may be omitted from the configuration of the first embodiment. In this configuration, too, the convenience of use of the electronic device 1 can be improved similarly to the first embodiment. The electronic device 1 comprising the relay 61 is highly versatile since the device can be used even if the wall switch 34 is in both the double-pole type and the single-cut type, and is highly useful since the device can be used irrespective of the type of the wall switch 34.

Fourth Embodiment

FIG. 23 shows an electronic device 1 of a fourth embodiment. In the present embodiment, the electronic device 1 comprises the light emitting unit 13 provided at a substantially central portion of a bulb, and the spherical globe 11 covering the light emitting unit 13. The electronic device 1 is, for example, an LED lamp but, instead of this, may be an incandescent lamp, a halogen lamp, a high intensity discharge (HID) lamp, a fluorescent lamp or the like. In this configuration, too, the convenience of use of the electronic device 1 can be improved similarly to the first embodiment.

Fifth Embodiment

FIG. 24 shows an electronic device 1 of a fifth embodiment. In the present embodiment, the electronic device 1 comprises, for example, the elongated light emitting unit 13. The light emitting unit 13 is a fluorescent lamp but, instead of this, may be a light emitting unit comprising light emitting elements such as LEDs. In the present embodiment, the power source unit 14, the battery 15 and the control unit 16 are provided on the back of the ceiling or the like. In this configuration, too, the convenience of use of the electronic device 1 can be improved similarly to the first embodiment.

Sixth Embodiment

FIG. 25 shows an electronic device 1 of a sixth embodiment. As shown in FIG. 25, a breaker 111 is provided in the middle of the power source supply line 31. The breaker 111 is an example of a switch provided outside the electronic device 1. The breaker 111 can be operated from the outdoors. The electronic device 1 is connected to the power source supply line 31 in which power supply from the AC power source 32 and cutoff of the power supply are switched by the breaker 111. The electronic device 1 is connected to the power source supply line 31 by being connected to, for example, a receptacle provided indoors. The electronic device 1 according to the present embodiment detects the power supply or no supply from the AC power source 32 and the state of the breaker 111, and controls the power to be supplied to a load unit 112 (output unit).

More specifically, the electronic device 1 comprises the determination unit 51, the detection unit 52, and the control unit 53. The determination unit 51 is electrically connected to the first line 42 to determine the power supply or no supply from the AC power source 32. The detection unit 52 is electrically connected to the first line 42, and detects a conductive state of the breaker 111 when, for example, the determination unit 51 determines no power supply from the AC power source 32. The control unit 53, at least, cuts off the power to be supplied to the electronic device 1, supplies the power from the AC power source 32 to the electronic device 1, or supplies the power from the battery 15 to the electronic device 1, based on the outputs of the determination unit 51 and the detection unit 52.

More specifically, the electronic device 1 operates in a manner as described below.

[If the Breaker 111 is Conductive at Normal Time]

If the breaker 111 is in a conductive state at a normal time, a voltage monitoring circuit 63 sends the first signal (toggle signal) to the control circuit 64, based on the AC power source 32. The control circuit 64 determines that the power is supplied from the AC power source 32 by receiving the first signal, and controls the power source switch 49 such that the power is supplied from the AC power source 32. Accordingly, the electronic device 1 can be supplied with the power from the AC power source 32 to operate.

[If Breaker is Cut Off]

The breaker 111 may often be automatically cut off by, for example, an earthquake or the like. In this case, the second signal is input from the voltage monitoring circuit 63 to the control circuit 64. The control circuit 64 controls the power source switch 49 so as to cut off the power supply to the electronic device 1, based on the second signal.

[If Breaker 111 is Operated to Return in the Event of Power Failure]

If the breaker 111 is operated to return (made to be conductive) in the event of a power failure after the earthquake, the third signal is input from the voltage monitoring circuit 63 to the control circuit 64. The control circuit 64 controls the power source switch 49 so as to cause the power to be supplied from the battery 15 to the electronic device 1, based on the third signal. Accordingly, the electronic device 1 can be supplied with the power from the battery 15 and operated.

According to the above configuration, the electronic device 1 capable of attempting to enhance the convenience of use can be provided. That is, according to the configuration, the power can be supplied from the battery 15 to the electronic device 1 by returning the breaker 111 even in a situation where the power of the AC power source 32 is not supplied in the event of a power failure. Thus, the electronic device 1 which is useful at an emergency time can be provided.

Several embodiments and modified examples described above can be implemented in combination with one another, or by replacement. For example, each of the modified examples of the first embodiment may be suitably applied in the configurations of the second to sixth embodiments. In addition, the embodiments and the modified examples may be variously modified individually.

According to the above configuration, the power source supply system capable of enhancing user's convenience of use can be provided. The power source supply system comprises, for example, the power source supply line 31, the wall switch 34, and the electronic device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device capable of switching power on and power off by a switch outside the electronic device, the electronic device being connected to an AC power source via a power source supply line, the switch being connected in the power source supply line, the electronic device comprising:
a determination unit configured to determine whether power is supplied from the AC power source or not;
a second power source different from the AC power source;
an output unit;
a power source line connected to the power source supply line;
a relay provided in the power source line and opened when the determination unit determines that no power is supplied from the AC power source;
a potential setting unit configured to set the power source line between the relay and the switch to a first potential;
a potential detecting unit configured to detect a conductive state of the switch based on the first potential set by the potential setting unit; and
a control unit configured to perform at least one of cutting off power to be supplied to the output unit, supplying power from the AC power source to the output unit, and supplying power from the second power source to the output unit based on a determination by the determination unit and the conductive state of the switch detected by the potential detecting unit.

2. The electronic device of claim 1, wherein the potential setting unit is supplied with power from the second power source.

3. The electronic device of claim 1, wherein the determination unit comprises a voltage variation detecting unit configured to detect voltage variation of the power source line, and determine power supply and no power supply from the AC power source by detecting the voltage variation in a predetermined period.

4. The electronic device of claim 3, wherein the potential detecting unit and the voltage variation detecting unit are configured to share:
a resistor connected to the power source line; and
a photo-coupler configured to detect a current flowing through the resistor and output a detection signal to the control unit.

5. The electronic device of claim 4, wherein the control unit is configured to cause a resistance of the resistor to be smaller when no power is supplied from the AC power source, as compared with a state in which the power is supplied from the AC power source.

6. The electronic device of claim 1, wherein
the power source supply line comprises a hot wire and a ground wire, and the switch causes at least the hot wire conductive or cuts off at least the hot wire,
the power source line includes a first line connected to the determination unit and the potential detecting unit, and a second line different from the first line, and
the electronic device further comprises a polarity switching unit configured to switches the power source line to connect the first line to the hot wire and connect the second line to the ground wire.

7. The electronic device of claim 6, wherein the control unit is configured to automatically switch the polarity switching unit in accordance with a level of the voltage applied to the power source line.

8. The electronic device of claim 1, wherein the output unit comprises a light emitting unit.

9. The electronic device of claim 8, wherein the control unit is configured to control the light emitting unit to emit light in a first emission mode when the power is supplied from the AC power source and to emit light in a second emission mode when the power is supplied from the second power source.

10. The electronic device of claim 9, wherein the light emitting unit is caused to flash at least one time in the second emission mode.

* * * * *